United States Patent [19]

Curtin, II et al.

[11] Patent Number: 5,521,986

[45] Date of Patent: May 28, 1996

[54] COMPACT DATA INPUT DEVICE

[75] Inventors: William J. Curtin, II, Fitchburg; William J. Curtin, IV, Madison; Brian W. Torvik, McFarland, all of Wis.

[73] Assignee: American Tel-A-Systems, Inc., McFarland, Wis.

[21] Appl. No.: 351,199

[22] Filed: Nov. 30, 1994

[51] Int. Cl.⁶ ............................................. G06K 9/00
[52] U.S. Cl. ............... 382/187; 382/100; 358/530; 345/156; 345/174; 315/169.1; 341/22; 340/815.44
[58] Field of Search .................................... 382/100, 187; 358/530; 315/169.1; 345/174, 156; 341/22, 173; 340/815.44

[56] References Cited

U.S. PATENT DOCUMENTS

| | | | |
|---|---|---|---|
| 3,108,254 | 10/1963 | Dimond | 382/187 |
| 3,618,029 | 11/1971 | Graven | 315/169.1 |
| 3,647,973 | 3/1972 | James et al. | 179/2 DP |
| 3,704,343 | 11/1972 | Howard | 178/30 |
| 3,760,373 | 9/1973 | Bartz | 340/172.5 |
| 3,909,785 | 9/1975 | Howells | 340/146.3 SY |
| 3,980,823 | 9/1976 | Howard | 340/365 R |
| 4,199,751 | 4/1980 | Piguet | 340/365 S |
| 4,220,948 | 9/1980 | Trame | 340/815.44 |
| 4,224,615 | 9/1980 | Penz | 345/174 |
| 4,232,290 | 11/1980 | Yasuda et al. | 382/187 |
| 4,291,307 | 9/1981 | Peelle et al. | 340/756 |
| 4,360,892 | 11/1982 | Endfield | 364/900 |
| 4,375,922 | 3/1983 | Maegawa et al. | 400/70 |
| 4,458,243 | 7/1984 | Sado et al. | 340/756 |
| 4,477,797 | 10/1984 | Nakagiri | 382/187 |
| 4,532,378 | 6/1985 | Nakayama et al. | 179/2 DP |
| 4,559,598 | 12/1985 | Goldwasser et al. | 364/419 |
| 4,585,908 | 4/1986 | Smith | 179/81 C |
| 4,649,563 | 3/1987 | Riskin | 379/97 |
| 4,654,874 | 3/1987 | Yamamoto | 382/187 |
| 4,672,759 | 6/1987 | Docherty et al. | 40/450 |
| 4,674,112 | 6/1987 | Kondraske et al. | 379/96 |
| 4,677,659 | 6/1987 | Dargan | 379/97 |
| 4,724,423 | 2/1988 | Kinoshita | 340/265 S |
| 4,727,357 | 2/1988 | Curtin et al. | 341/22 |
| 4,737,980 | 4/1988 | Curtin et al. | 379/97 |
| 4,746,913 | 5/1988 | Volta | 340/706 |
| 4,783,645 | 11/1988 | Goldwasser et al. | 340/365 R |
| 4,794,390 | 12/1988 | Lippman | 340/756 |
| 4,806,745 | 2/1989 | Oogita | 235/492 |
| 4,823,294 | 4/1989 | Rouhani | 364/709.12 |
| 4,833,446 | 5/1989 | Eilam et al. | 341/22 |
| 4,849,732 | 7/1989 | Dolenc | 341/20 |
| 4,860,372 | 8/1989 | Kuzunuki et al. | 382/187 |
| 4,862,166 | 9/1989 | Yamakawa | 341/22 |
| 4,872,008 | 10/1989 | Ohtsuka et al. | 341/26 |
| 4,879,557 | 11/1989 | Roche | 341/23 |
| 4,882,581 | 11/1989 | Inobe et al. | 341/22 |
| 4,887,082 | 12/1989 | Yamada et al. | 341/26 |
| 4,897,651 | 1/1990 | DeMonte | 341/23 |
| 4,905,007 | 2/1990 | Rohm | 341/173 |

(List continued on next page.)

OTHER PUBLICATIONS

Seybold, Pen Computing Magazine, Nov. 1994, "Major Breakthrough for PDAS".
"Graffiti Reference Card" (date unknown).

Primary Examiner—Jose L. Couso
Assistant Examiner—Anh Hong Do
Attorney, Agent, or Firm—Lowe, Price, LeBlanc & Becker

[57] ABSTRACT

A data entry apparatus includes a mosaic display as a template for inputting characters, by a stylus or other device. The displayed mosaic includes a plurality of segments, each represented by a tile area of the template. Inputted characters are recognized based on first and second tile areas contacted by the stylus or otherwise selected by an operator. The two tile areas may be the same or different, and may be the initial and final areas of the input operation. To enable character input by no more than two operations, hinge tile areas are provided, each representing selection of a plurality of standard tile areas. The system further recognizes input characters in response to a single input stroke, based on the initial and final tile areas thereof and, when the stroke is imprecisely inputted, by reference to directional characteristics thereof.

31 Claims, 11 Drawing Sheets

U.S. PATENT DOCUMENTS

| | | | |
|---|---|---|---|
| 4,916,440 | 4/1990 | Faeser et al. | 340/706 |
| 4,918,634 | 4/1990 | Nishimori | 364/709.12 |
| 4,918,721 | 4/1990 | Hashimoto | 379/96 |
| 4,926,173 | 5/1990 | Frielink | 341/22 |
| 4,973,960 | 11/1990 | Mount, II | 341/23 |
| 5,016,002 | 5/1991 | Levanto | 340/756 |
| 5,057,836 | 10/1991 | Inaba | 341/26 |
| 5,079,624 | 1/1992 | Sasuga et al. | 358/530 |
| 5,087,910 | 2/1992 | Guyot-Sionnest | 340/711 |
| 5,117,455 | 5/1992 | Danish | 379/368 |
| 5,128,672 | 7/1992 | Kaehler | 341/23 |
| 5,168,553 | 12/1992 | Okazaki et al. | 395/143 |
| 5,181,029 | 1/1993 | Kim | 341/23 |
| 5,189,416 | 2/1993 | Estes | 341/26 |
| 5,227,614 | 7/1993 | Danielson et al. | 382/100 |
| 5,254,989 | 10/1993 | Verrier et al. | 341/26 |
| 5,266,950 | 11/1993 | Gulick et al. | 341/22 |
| 5,270,709 | 12/1993 | Niklsbacher | 341/20 |
| 5,276,794 | 1/1994 | Lamb, Jr. | 395/149 |
| 5,281,966 | 1/1994 | Walsh | 341/22 |
| 5,303,312 | 4/1994 | Comerford et al. | 382/187 |
| 5,339,358 | 8/1994 | Danish et al. | 379/368 |

Figure 3

|    | 1 | 2 | 3 | 4 | 5 | 6 | 7 | 8 | 9 | 10 | 11 | 12 | 13 | 14 | 15 | 16 | 17 | 18 | 19 | 20 |
|----|---|---|---|---|---|---|---|---|---|----|----|----|----|----|----|----|----|----|----|----|
| 20 |   | 6 |   | 5 |   | g | 1 |   |   |    |    |    |    |    |    |    |    |    |    | 8  |
| 19 | j |   | 7 |   |   |   |   |   |   |    |    |    |    |    |    |    |    |    |    |    |
| 18 | 4 |   |   |   |   |   |   |   |   |    |    |    |    |    |    |    |    |    | 9  |    |
| 17 |   | f |   |   |   |   |   |   |   |    |    |    |    |    |    |    | p  |    |    |    |
| 16 | l |   |   |   |   |   |   |   |   |    |    |    |    |    |    | c  |    |    |    |    |
| 15 |   |   |   |   |   |   |   |   |   |    |    |    |    |    | b  |    |    |    |    |    |
| 14 |   |   |   |   |   |   |   | j |   |    |    |    |    | d  |    |    |    |    |    |    |
| 13 |   |   | q | q | r |   | r | n |   | k  |    | w  |    |    |    |    |    |    |    |    |
| 12 |   |   |   |   |   |   |   | y |   | y  |    | y  |    |    |    |    |    |    |    |    |
| 11 |   |   |   |   |   |   |   | x |   | z  |    | w  |    |    |    |    |    |    |    |    |
| 10 |   | m |   |   | m |   |   | v | k |    | z  | y  | k  |    |    |    |    |    |    |    |
| 9  | t |   |   |   |   |   |   | i | k |    |    |    |    |    |    |    |    |    |    | 1  |
| 8  |   | m |   |   | m |   |   | v | x | y  | n  |    |    |    |    |    |    |    |    |    |
| 7  | u |   |   |   |   | o |   |   |   |    |    |    | r  | j  |    |    |    |    |    | g  |
| 6  | d |   | 2 |   | 3 |   | m |   | m |    |    |    |    |    |    |    |    |    |    |    |
| 5  |   | s |   | 9 | 3 |   |   |   |   |    |    |    | r  |    |    |    |    |    |    | 5  |
| 4  | h |   | p | a | 9 |   |   |   |   |    |    |    | q  |    |    |    |    |    |    |    |
| 3  |   | e |   | p | 2 |   |   |   |   |    |    |    | q  |    |    |    |    |    |    |    |
| 2  | b | g | e |   | s |   | m |   | m |    |    |    |    |    |    |    | f  |    |    | 8  |
| 1  |   | b |   | h | d | u |   | t |   |    |    |    |    |    |    | l  |    | 4  |    |    |

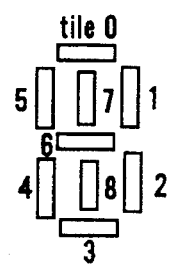
*Figure 9*
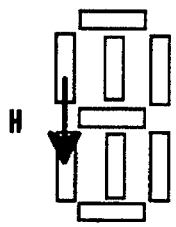 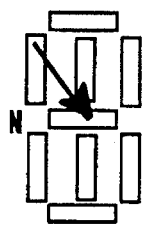 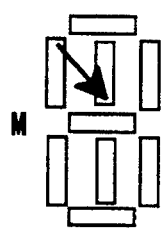 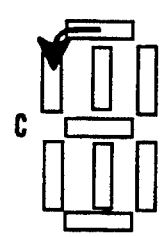
*Figure 10*     *Figure 11*     *Figure 12*     *Figure 13*
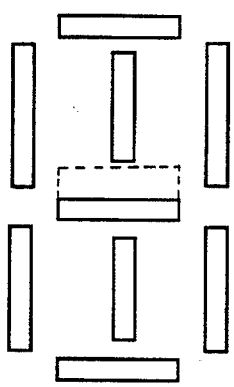 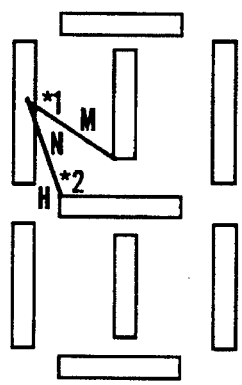
*Figure 14*     *Figure 15*

COMPACT DATA INPUT DEVICE

TECHNICAL FIELD

This invention relates to data input devices, and more particularly to a structure for efficiently inputting character data, such as alphanumeric characters, to a data processing device without requiring a keyboard, thereby to enable efficient utilization of miniaturized data manipulation devices such as personal digital assistants (PDA's), as well as to enable use of devices having a limited number of input switches or keys, such as remote control units for various home entertainment and other devices, to input complex alphanumeric data, thereby to provide truly interactive communication without requiring extensive replacement and reconfiguration of communication systems and individual elements of such systems.

BACKGROUND ART

It is known in the art to input data to various forms of data processing devices by the use of keyboards having a plurality of input keys, wherein each key corresponds to a particular data element such as an alphanumeric character. A typical configuration of such a keyboard is known as a "QWERTY" configuration, wherein the first six switches on one of the keyboard rows respectively represent the alphabetic characters Q, W, E, R, T and Y. However, such keyboards require a large number of keys and switches, and thus require a large amount of space, mitigating against true portability.

It is also known in the art to use a single configuration of a small number of switches for inputting a character to a data processing device by operating particular subgroups of the switches to represent particular characters, as illustrated by Curtin et al. U.S. Pat. No. 4,727,357, commonly assigned herewith. The disclosure of U.S. Pat. No. 4,727,357 is incorporated herein by reference. In the input configuration disclosed therein, switches are arranged in a particular mosaic layout, as segments of a standard "figure 8" or "British flag" configuration. Switches corresponding to segments of the mosaic which together form a shape of a particular character are operated to input that character to a data processing device.

As disclosed in the prior U.S. Pat. No. 4,727,357 patent, each switch is associated with a display bar representing a segment of the "figure 8" or other mosaic configuration, so that the mosaic segments activated by the user are displayed while a character is being entered. It should be appreciated that such display bars may be light emitting, light transmitting, or any other type which provides different optical characteristics in response to activation or deactivation, or in response to presence or absence of a selecting control signal or the like.

After each switch operation and based on the inputted segments of the mosaic display, the data processing device may "guess" at the character being inputted by the operator, and display a list of characters which may correspond to the particular pattern of switches thus far operated. The disclosed system thus enables the operator to shorten the data input process by selecting the input character from the characters displayed in the list. However, in the device of the U.S. Pat. No. 4,727,357, characters having a large number of segments (such as the letter "M") require a longer sequence of input switch activations than that required for characters having a smaller number of segments (such as the letter "I").

Thus, for a known segment input device which is usable instead of a keyboard the input procedure tends to be lengthy and time consuming, when compared with a character input procedure using one-switch per character, as available in a standard keyboard.

In view of the large variation in the number of segments in the inputted characters, wherein an "I" has only two input segments for example while an "M" has 6 input segments, it is thus difficult to use the concepts of the above described prior art to input character data with a fixed, predetermined, number of switch activations for each character.

Thus, data input with the prior art device requires a variable number of switch activations and fails to provide an efficient method and apparatus for input of character data which is competitive with a standard keyboard in data input speed. For that reason, known PDA devices, such as the "Newton" available from Apple Computer Inc., Cupertino, Calif., include data input arrangements utilizing a handwriting recognition process, for recognizing a handwritten input message. Such messages are inputted to the known PDA by an operator with the aid of a stylus, or pen component, of the PDA acting in conjunction with a pen sensing display for example. As an alternative data input arrangement, such a PDA also utilizes a simulated keyboard wherein a miniaturized keyboard is displayed on the pen sensing display, and the operator selects specific characters by selecting a particular simulated key with the aid of the input stylus.

However, known handwriting recognition techniques are slow and, unless significantly more storage is provided than is feasible for such portable PDA devices, are subject to errors. Moreover, since the object of PDA devices is to provide a small, compact, data manipulation device, the displays available with such devices are necessarily small. Accordingly, the simulated keyboard keys displayed by a PDA are small and require precise pointing with the stylus thereof. Such a requirement for precise pen positioning with respect to a small image of a keyboard key thus further slows the process of inputting data to the PDA.

There is thus a need in the prior art for a compact data input device which operates efficiently, quickly and reliably for inputting character data to data processing devices.

There is a more specific need in the art for a reliable compact data input device which permits input of character data to a data processing device using a fixed number of operations for each of the input characters.

There is yet a further need in the prior art for a compact data input device wherein an operator is permitted a degree of imprecision, so that a sequence of operator input operations which do not match, but are sufficiently close to, a required sequence for inputting a particular character is nonetheless recognized as the required input sequence for the particular character.

DISCLOSURE OF INVENTION

It is accordingly an object of the present invention to overcome the difficulties of the prior art, and to provide a method and apparatus for quickly, effectively and efficiently inputting data to a processing device, free of the deficiencies of the prior art.

It is a more specific object of the invention to provide a data input apparatus, including a standardized mosaic of input tile areas and a plurality of sensors associated therewith for identifying a character being inputted by an operator using a movable input device, in which the data input apparatus responds to a limited number of characteristics of the input character to recognize the character and to generate a data signal representative thereof.

It is a more particular object of the invention to provide a simplified manner of recognizing an inputted character by generating the tile areas on a display to provide a template for operator input of a character, and to provide a single character input region on the display, with a plurality of tile areas, for input of a single character, using a single template including a single set of tile areas.

It is a further object of the invention to provide sections of the character input region adjacent the tile areas for detecting imprecise use of the movable input device by the operator, thereby to enable recognition of the input character under conditions wherein predetermined tiles corresponding to a predetermined character are not inputted.

It is still a more particular object of the invention to provide a data input device responding to two characteristics of an input character to recognize the character, thus to provide increased input speed for operator input of characters.

Still a more specific object of the invention is to provide a data input device which recognizes any character inputted by an operator in response to operations associated with two tile areas of a mosaic configuration.

Thus, it is an object of the invention to provide a standardized mosaic of standard tile areas representing segments of a character to be recognized, and to include hinge tile areas in the mosaic, the hinge tile areas each representing operations associated with a plurality of standard tile areas, thereby to enable recognition of a character in response to detection of operations associated with only two tile areas.

It is a further object of the invention to provide a data input device which responds to an operation associated with a tile area by an operator and to a characteristic of a gesture, or stroke, passing through the tile area to recognize a character inputted by an operator.

It is yet another object of the invention to provide a data input device which responds to a slope of a gesture beginning at a detected tile area in order to recognize a character being inputted by the operator.

It is still another object of the invention to provide a data input device wherein, upon failure of an operator to perform operations associated with a pair of predetermined tile areas of a mosaic, the input character is recognized based on the slope of an input stroke of a stylus input device relative to the mosaic.

Yet another object of the invention is to confirm to an operator operations associated with particular tile areas of the mosaic by extinguishing displays of tile areas for which operation has been detected.

In accordance with the foregoing and other objects of the invention, there is accordingly provided a data input apparatus for recognizing any of a plurality of characters inputted by an operator. The apparatus includes a character input region for inputting a character, the character input region including a plurality of sensors for sensing operator inputs and generating sensor signals indicative thereof, and a plurality of predefined tile areas each including at least one of the plurality of sensors. The apparatus further includes a movable input device for providing to operator inputs to any of the plurality of sensors by inputting data relevant to the tile areas and an analyzing device receiving the sensor signals for recognizing a character being inputted by the operator. The analyzing device includes: a first component responsive to the sensor signals for detecting an operator input to a first tile area where the movable input device is first sensed by a sensor and generating a first tile identification signal indicative thereof; a second component responsive to the sensor signals for detecting an operator input to a second tile area where the movable input device is secondly sensed by a sensor and generating a second tile identification signal indicative thereof; and a third component responsive to the first tile identification signal and the second tile identification signal for recognizing a character being inputted by the operator and generating a character signal indicative thereof.

In accordance with the invention, the movable input device may include a pen. The pen may be of an electromagnetic, infrared, optical or contact type.

The inventive data input apparatus may further include a display responsive to the character signal for displaying the character recognized by the third component of the analyzing device.

In accordance with the invention, the tile areas may include a single set of tile areas, for inputting only a single character at a time, in a time sequence of singly inputted characters.

The tile areas are preferably configured in accordance with a generic character configuration, generic to a plurality of individual characters, in which each tile area corresponds to and represents one of a plurality of segments of the generic character configuration. In such an arrangement, the display preferably responds to the character signal for displaying the character recognized in response to operator inputs to two tile areas.

In recognition of the fact that an operator may not provide an input precisely to a predefined tile area including the sensors therein, however, the inventive apparatus may further include additional sensors, adjacent the predefined tile areas. In such an arrangement, the third component recognizes a character intended to be inputted by the operator (and generates a character signal indicative thereof) by deducing the intended operator inputs in response to signals outputted from the additional sensors, when the movable input device fails to provide the operator input to a predefined tile area.

More generally, however, the third component responds to the first and second tile identification signals for identifying the character being inputted by the operator. For some input characters, the first and second tile areas identified by the identification signals may be the same tile area. For other characters, the first and second tile areas are different tile areas.

As part of the invention, the character input region may further include at least one hinge tile area in addition to the standard tile areas, where the hinge tile area receives a single operator input and including means responsive to such a single operator input by providing signals to a plurality of the standard tile areas. In such an arrangement, the first and second tile areas to which the third component responds include a hinge tile area.

Further, the character input region of the inventive data input apparatus may include an input display for displaying a tile area inputted by an operator, the input display including display segments corresponding to and adjacent to the tile areas for confirming to the operator an input corresponding to a desired tile area. Segment illuminating means may be provided for illuminating the display segments of the input display, and segment extinguishing means may be provided for extinguishing illuminated display segments, in which the segment extinguishing means respond to an operator input to a tile area by extinguishing a display of a segment corresponding to the inputted tile area.

Where hinge tile areas are included, the inventive apparatus preferably includes at least one hinge tile area receiving a single operator input by a single operation of the movable input device, and the segment extinguishing means responds to the single operator input to a hinge tile area by extinguishing displays of a plurality of display segments corresponding to a plurality of tile areas.

In such a configuration, the first component may be responsive to the sensor signals for detecting an initial tile area, where the movable input device is initially sensed by a sensor, and generates an initial tile identification signal indicative thereof. The second component may be responsive to the sensor signals for detecting a final tile area, where the movable input device is finally sensed by a sensor, and generates a final tile identification signal indicative thereof. The third component of this configuration is thus responsive to the initial tile identification signal and to the final tile identification signal, for recognizing a character being inputted by the operator and generating the character signal indicative thereof based on the initial and final tiles inputted by the operator.

According to another feature of the invention, there is also provided a direction means, for identifying a direction of movement of the movable input device and for generating a direction identifying signal indicative thereof. The third component thus responds to the direction identifying signal, to the first tile identification signal and to the second tile identification signal for recognizing the character inputted by the operator.

For this aspect of the invention, the direction means may include a capturing means for capturing a stroke of the movable input device relative to the character input region. The stroke is captured by sensing a sequence of coordinates of a sequence of points along the stroke. The direction means thus identifies the direction of movement of the movable input device as a function of differences between coordinates of points in the sequence of points.

More generally, however, the direction means includes means for identifying a stroke of the movable input device relative to the character input region and the third component includes means is responsive to a fixed predetermined number of operations, including operator inputs to tile areas and strokes of the movable input device, for recognizing the character being inputted by the operator.

In accordance with another aspect of the invention, there is provided a data input apparatus for recognizing any of a plurality of characters inputted by an operator. The apparatus includes a character input region for inputting a character, the character input region including a plurality of sensors for sensing operator inputs and generating sensor signals indicative thereof, and a plurality of predefined tile areas each including at least one of the plurality of sensors. The apparatus further includes a movable input device for providing operator inputs to any of the plurality of sensors by inputting data relevant to the tile areas and an analyzing device receiving the sensor signals for recognizing a character being inputted by the operator. The analyzing device includes: an initial component, responsive to the sensor signals for detecting an operator input to an initial tile area, where the movable input device is initially sensed by a sensor, and generating an initial tile identification signal indicative thereof; a direction component for identifying a direction of movement of the movable input device and for generating a direction identifying signal indicative thereof, and a third component responsive to the initial tile identification signal and to the direction identifying signal for recognizing a character being inputted by the operator and generating a character signal indicative thereof.

For this aspect of the invention, the third component preferably includes limiting means responding to the initial tile identification signal by identifying a limited number of possible input characters being inputted by the operator as a function of the initial tile area represented by the initial tile identification signal. The possible input characters identified by the limiting means are each characters in which an input starts with an input to the initial tile area, and which have a unique subsequent tile area associated therewith. The limiting means generates a limiting signal indicative of the possible input characters. The data input apparatus further includes a second component responsive to the sensor signals, for detecting an operator input to a second tile area where the movable input device is secondly sensed by a sensor, and generates a second tile identification signal indicative thereof. In this arrangement, the third component responds to the limiting signal by determining whether the second tile identification signal identifies a tile area corresponding to one of the unique subsequent tile areas of the possible input characters. Upon detecting that the second tile area is one of the unique subsequent tile areas, the third component recognizes the inputted character as the character associated with the detected second tile area.

In this arrangement, the direction means includes capturing means for capturing a stroke of the movable input device relative to the character input region by sensing a sequence of coordinates of a sequence of points along the stroke and wherein. When it is detected that the second tile identification signal fails to identify any of the unique subsequent tile areas, the third component determines a slope of the stroke from the sequence of coordinates. The third component then recognizes the inputted character by comparing the slope of the stroke with predetermined slope ranges and by identifying specific characters in correspondence with results of the comparison.

For such a slope comparison character identification, the third component determines a particular slope range for comparison with the slope to recognize a particular character by identifying a boundary point on one of the unique subsequent tile areas corresponding to the particular character, identifying an initial point in the initial tile area wherein the movable input device first provided an input to the initial tile area, determining a nominal slope of a line connecting the initial point and the boundary point, and establishing the particular slope range in accordance with the nominal slope. The third component compares the slope of the stroke with the particular slope range and recognizes the particular character upon determining that the slope of the stroke is within the particular slope range.

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF THE DRAWING

The accompanying drawings, incorporated into and forming a part of the specification, illustrate several aspects of a preferred embodiment of the present invention and, together with the description, serve to explain the principles of the invention. In the drawings:

FIG. 3 illustrates various combinations of hide buttons used to input characters to the PDA of FIG. 1;

FIG. 9 shows a modified template configuration used in connection with another embodiment of the invention wherein input letters are represented by a single stroke;

FIGS. 10—13 are examples of stroke representations for several input characters inputted using the template of FIG. 9;

FIG. 14 shows an extended shape of a tile area used to check for a hit of a display segment;

FIG. 15 illustrates a technique used to ascertain an input character for an imprecisely inputted stroke;

BEST MODE FOR CARRYING OUT THE INVENTION

Figure 1:
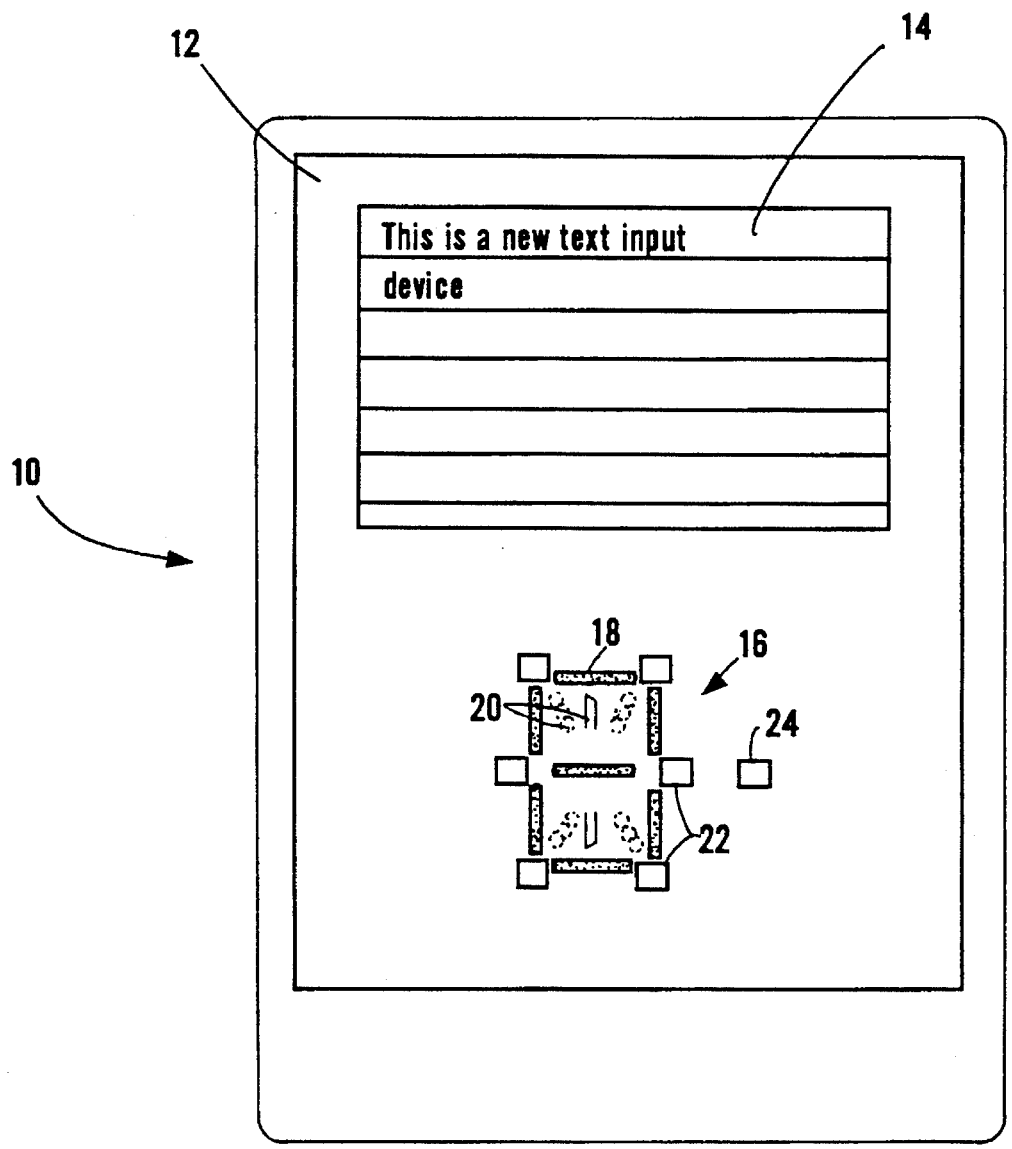
FIG. 1 illustrates a PDA incorporating the invention.

From the foregoing summary of the invention and its various objects, it will be appreciated that the present invention thus provides a plurality of embodiments for implementing the concept of inputting data to a data processing device without relying on a keyboard, and by using a template in conjunction with a plurality of tile areas sensitive to inputs from the user, where the tile areas of the template are associated with specific sensors to detect the user input. In accordance with the invention the input signals are processed to recognize a character, such as a letter of the alphabet, a number, or a symbol, being inputted by the user.

In the following disclosure, inputs are described as being provided by a stylus, or pen, operated by the user in conjunction with an input sensitive screen, such as a touch sensitive display. The input tile areas of the template correspond to display segments which are displayed on the screen, and the data processing device detects pen contact with the screen on, or in the vicinity of, the individual display segments. Although the description refers to a stylus or pen, it should be appreciated that any input device may be used. Thus, instead of a touch sensitive screen, there may be provided a screen, or display, including electromagnetic sensors for detecting the presence of a transmitter at particular coordinate locations thereon. Alternatively, the display may include optical sensors, such as infrared sensors for detecting infrared (or other) optical energy emitted by the input means at particular coordinate positions of the display. In general, any input means may be utilized which is capable of identifying, or selecting, an arbitrary input point relative to the coordinate system of the display.

In the presently preferred embodiment, it is considered that the operator uses a stylus for contacting the screen. However, the user's finger may be utilized for contacting the screen. Similarly, an apparatus remote from the display screen may be used to provide the inputs described herein. For example, such a remote projector may be used to project radiation or the like onto the screen from a distance, for detection by sensors of the data processing device. Any and all such input devices are included in the following description, and are covered by the terms "movable input means", "stylus" or "pen" as used herein.

In some of the embodiments disclosed in the following description, sensors in individual tile areas are activated by, or responsive to, the movable input means. Recognition of the input character relies on identification of the specific tile areas in which the activated sensors are located. While each tile area may be represented by a single sensor, in fact there are a plurality of touch sensitive areas, for example, which are located in each tile area and which correspond to each segment of the display mosaic forming the input template, provided for guiding the operator's input activities.

In one embodiment, additional tile areas are provided, although not displayed to the operator, as "hidden input keys" to permit entry of data with a degree of imprecision on the part of the operator. For example, outputs from sensors within predetermined distances, or within a predetermined number of pixels, from the displayed segments may be accepted to identify that a particular tile area has been inputted by the operator, even when the stylus contacts the pixels external to that tile area.

In another embodiment hinge tile areas are provided at intersections of a plurality of segments of the displayed mosaic. Selection of a hinge tile area for input is interpreted by the inventive device as a simultaneous selection of each of the plurality of mosaic segments intersecting thereat. It should be appreciated that use of such hinge tile areas, whether with or without display thereof, is helpful in reducing the number of operations required for recognition of a character.

Still further, in another embodiment of the invention, characters are recognized by capturing an input stroke of the stylus, specifically by determining the coordinates of the start point of the stroke, the end point of the stroke, and of the points along the stroke. From the coordinates of the points along the stroke, a direction characteristic thereof may be determined. In this embodiment, the character is identified by determining the direction of the stroke.

It will further be appreciated that the data processing device may be separate from the mosaic display apparatus. Thus, the various contact points of a stylus on a displayed template may be detected and transmitted, either by wired or wireless communication, including electromagnetic, optical, or sonic transmissions, to the remote data processing apparatus for recognition.

Yet another possible modification includes performing the recognition of an inputted character at one location and transmitting the results thereof for display or utilization to a remote utilization device, again either by wired or wireless communication.

Still further, as will be appreciated from the detailed description, an apparatus according to the invention may display the selected segments differently from non-selected segments, or may display the input stroke, thus aiding an operator who may not be fully familiar with the specific segments used to represent particular characters. Alternatively, in order to simplify the software and to expedite processing, the tile areas corresponding to selected segments of the mosaic template may not be differentiated from tile areas corresponding to non-selected segments of the template.

Finally, although a particular application of the invention relates to personal data assistants, including built-in software which detects stylus contact with predetermined areas on the display/input screen thereof, and which further include software for capturing an input stroke, it should be appreciated that the invention may be utilized in conjunction with a display and an input means which does not necessarily contact the display, such as a personal computer operating in conjunction with a mouse, a joy stick, a roller ball or other input pointing device. By provision of appropriate software programming thereto, the data processing capabilities of the personal computer may be utilized to recognize the character in the manner herein described.

Referring now to FIG. 1, a PDA embodying the invention is generally shown therein at 10. As is typical for such a device, the personal digital assistant 10 includes a display screen 12, typically a liquid crystal display, on which is displayed a text message 14. In accordance with the invention, the PDA also generates a mosaic display 16, having which may be of a "British Flag" 13 segment configuration. The mosaic display 16 forms a character input area for inputting a single character, with the aid of the various display segments thereof as a template.

In the illustrated mosaic display, the seven segments of the mosaic forming a figure "8" are illuminated, as illustrated by reference numeral 18. Several segments 20 are in the extinguished condition and, as will be appreciated by those of ordinary skill, by appropriately illuminating and extinguishing various combinations of the 13 segments of the template, the mosaic 16 may be caused to display any character of the English language alphabet, any numeral, as well as a number of symbols.

It should be appreciated that, while a particular configuration of display segments (and thus input tile areas) is shown for the mosaic display 16, different configurations may be used if it is desired to apply the inventive concept to other alphabets and to other sets of characters, such as Chinese characters.

In addition to the segments 18 and 20 which are used for forming the input characters, mosaic display 16 may also include a number of hinge segments 22, as well as one or more special purpose segments (or keys) 24. The special purpose segment 24 of FIG. 1 may be used to differentiate between numerals and letters, such as differentiating between the letter "O" and the number "0", in a manner described below.

In accordance with the invention, associated with each segment of the mosaic display 16 is a corresponding tile area, representing an input to the PDA. Thus, for the configuration illustrated in FIG. 1, there are provided standard tile areas corresponding to the display segments 18 and 20, as well as hinge tile areas corresponding to the hinge segments 22 and special purpose tile areas corresponding to the special purpose segments 24.

As above noted, the tile areas preferably include a plurality of sensors to sense contact or other input condition. The sensors are coextensive with the segments represented thereby and corresponding thereto. Thus, when the mosaic display of the PDA displays a template figure "8" in its default condition, a user may apply a stylus to contact the tile area corresponding to the upper horizontal segment 18 of the template, and may further apply the stylus to contact the tile area corresponding to the lower horizontal segment thereof. Upon detecting contact with a tile area corresponding to a particular segment, the inventive apparatus according to the embodiment illustrated in FIG. 1 extinguishes the respectively corresponding segment of the mosaic display 16. Thus, in response to contacting the upper and lower horizontal tile areas, the corresponding segments are extinguished and the resulting display illustrates the letter "H". Accordingly, by using two input operations, an operator has changed the mosaic display from its default configuration of "8" to a specific character, "H". By recognizing the specific tile areas operated by the user, and the corresponding segments to be changed from the default display configuration, the system thus recognizes the character being inputted by the operator. Upon recognizing an input character, the system may display the same as the next character of the displayed text message 14, or may transmit the same to an external utilization device.

Special purpose segments such as 24 may be provided for shifting the case of the input character (uppercase and lowercase), or for generating punctuation marks. Alternatively, the punctuation marks, case commands and the like may be inputted by activation of various ones of the tile areas associated with the mosaic display 16.

In accordance with the embodiment illustrated in FIG. 1, operation of a hinge tile area by contacting the same with the stylus results in operation of a plurality of adjacent, or intersecting, display segments provided thereat. Thus, by appropriately encoding the specific combinations of tile areas to be interpreted as specific characters, the inventive system receives coded inputs comprised of sequences of standard tiles and/or hinge tiles activated by the user. Addition of the hinge tile areas enables any English language character to be inputted by activating only two tile areas representing display segments which, together, form a display reminiscent of the character.

Inputting of a sequence of two-tile activations to represent a stream of characters advantageously provides a steady rhythm for operator operations, as well as a reduced number of such operations, when inputting character data. Each of these features provides an advantage in simplifying the nature of operator input, thus enhancing simplicity of operation of the device.

Figure 8:
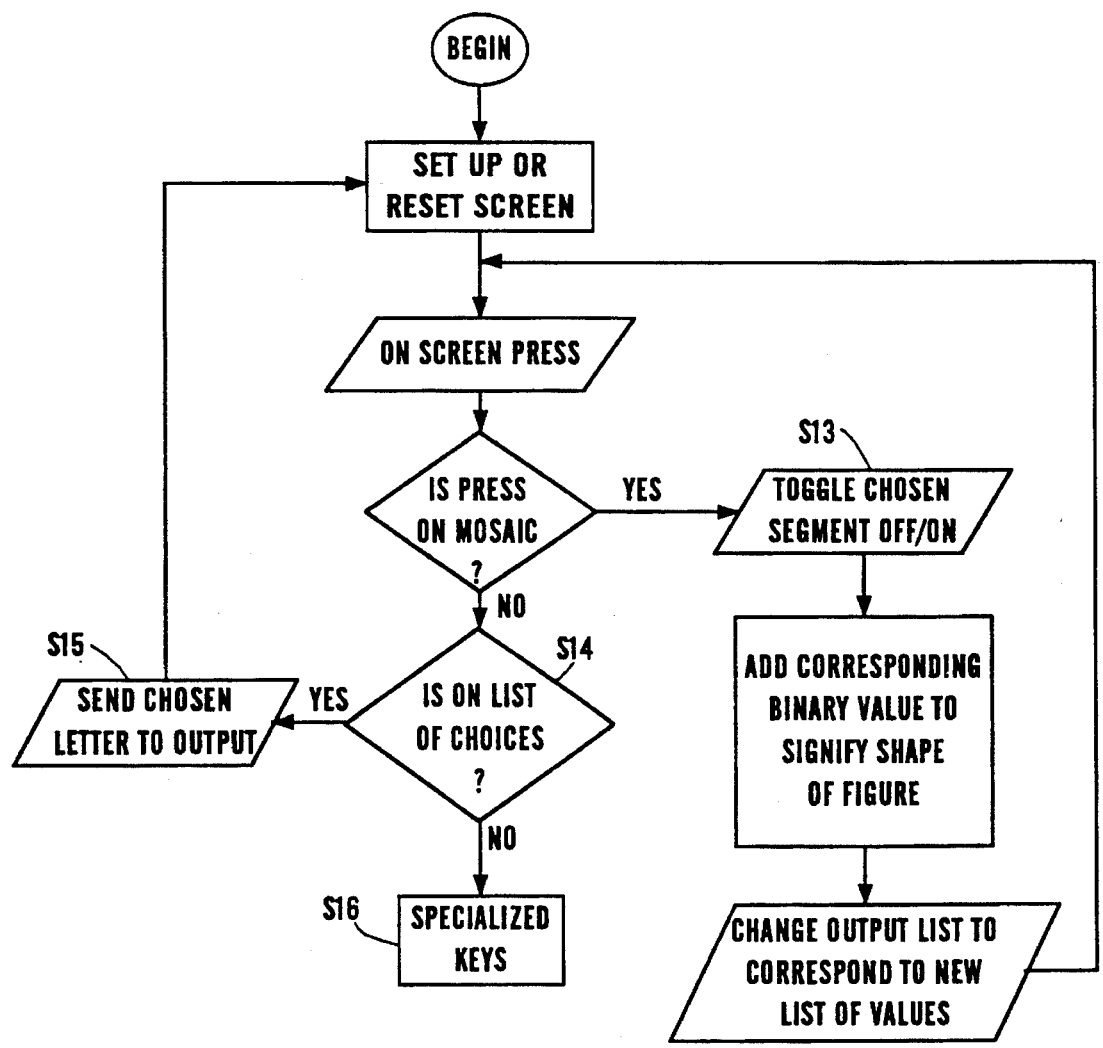

For example, in order to convert the default figure-8 display to a letter "C", and thus to input the letter "C" to the PDA, the two righthand vertical segments of the mosaic display of FIG. 1 should be extinguished, as should the middle horizontal segment thereof. Ordinarily, to extinguish three segments would require three operations. In accordance with the invention, however, operation of the central hinge tile area, in the righthand vertical portion of the mosaic display, results in extinguishing all standard segments connected thereto and in providing an input effectively corresponding to (simultaneous) operation of the three tile areas associated therewith. By extinguishing the two vertical segments and the central horizontal segment of the display connected to the above-noted hinge tile area, there results a representation of the letter "C" after a single input operation.

Although it is possible to operate the system to have either one or two inputs for determining the input character, in accordance with the preferred embodiment illustrated at FIG. 1, a fixed number of operations is required for input of all characters. Since not all characters can be inputted by a single stylus contact, the system requires a fixed higher number of input operations in order to maintain a steady input rhythm and to avoid confusion as to the identity of the inputted character. Thus, for situations in which a stylus input to a single tile area results in display of the desired input character, the system according to the present invention awaits a second input in order to recognize the inputted character. While the second input may be to any tile area, and a specific "no-op" tile area may be provided, for simplicity the preferred embodiment requires a repeated input to the same tile area, which is simpler to implement than providing an input to a second tile area removed therefrom.

Thus, in the immediately preceding example for inputting the character "C", a second activation is required of the central hinge tile area in the righthand vertical portion of the display. In a similar situation, although providing a single stylus input to the bottom horizontal display segment results in a completed display of the letter "A", according to the invention embodied in FIG. 1 the bottom horizontal tile area is required to be activated twice.

It should thus be appreciated that the invention according to the embodiment of FIG. 1 provides a system wherein inputs are provided to particular tile areas of an input surface in order to input an encoded version of a particular alphanumeric character. Advantageously, the coding is such as to correspond to a display of the inputted character, thus aiding the operator in inputting the data. Of course, while the foregoing description has been provided in terms of extinguishing illuminated display segments, it should be appreciated that the concept underlying the above described embodiment of FIG. 1 may be equally applicable to situations wherein the identified segments are to be illuminated from a default "blank" condition, rather than extinguished from an illuminated condition. The invention is equally applicable to situations wherein both illumination and extinction of segments is being implemented to arrive at the input character.

As previously noted herein, the present invention may also be utilized in situations wherein the input to the data processing system is provided by a different surface from that on which the template is displayed, i.e., wherein the input is not provided by directly contacting (or irradiating) portions of the display corresponding to segments of the input character being formed. Thus, a mouse or joystick may be used to move a cursor, or an icon, on a display screen on which the template is displayed.

However, neither the joystick nor the mouse actually contacts, irradiates, or otherwise communicates with any sensors on or in the vicinity of the segments of the displayed template. In accordance with the invention, the system nonetheless operates by responding to input signals identifying the specific segments to be extinguished. Thus, if the display screen 12 were an output display of a personal computer for example, movement of a cursor to a particular display segment, coupled either with clicking on the segment or operating the "Enter" key, or some other well known approach, may be used to select the specific segment as part of the encoded character being inputted. As the manner of obtaining an appropriate correspondence between the selected areas of the display and the displayed segments of the template is well known, and uses standard techniques, the same is not repeated herein. It will be appreciated that the concept of identifying the inputted character in such an environment is quite similar to, and an equivalent of, the previously described concept for inputting character data to a PDA having a touch sensitive display screen.

As one example of the latter, in accordance with the invention, the letter "I" is inputted by twice contacting the upper center vertical tile area corresponding to the upper center vertical display segment. In a straightforward manner, the inventive system is preferably programmed to respond to activation of the upper center vertical tile area by extinguishing each of the seven segments forming the default figure "8" and by illuminating both of the top and bottom center vertical segments. As will be understood from the foregoing, in order to maintain a fixed number of operations, and constant rhythm, for data input, the letter "I" is recognized upon twice contacting the upper center vertical tile area. Input of the letter "K" is implemented by contacting the upper center vertical tile area coupled with operation of either of the slanted righthand segments at the interior of the mosaic display, in either order. Alternatively, the bottom center vertical tile area may be contacted in combination with either of the slanted righthand segments, in any order.

Figure 2:
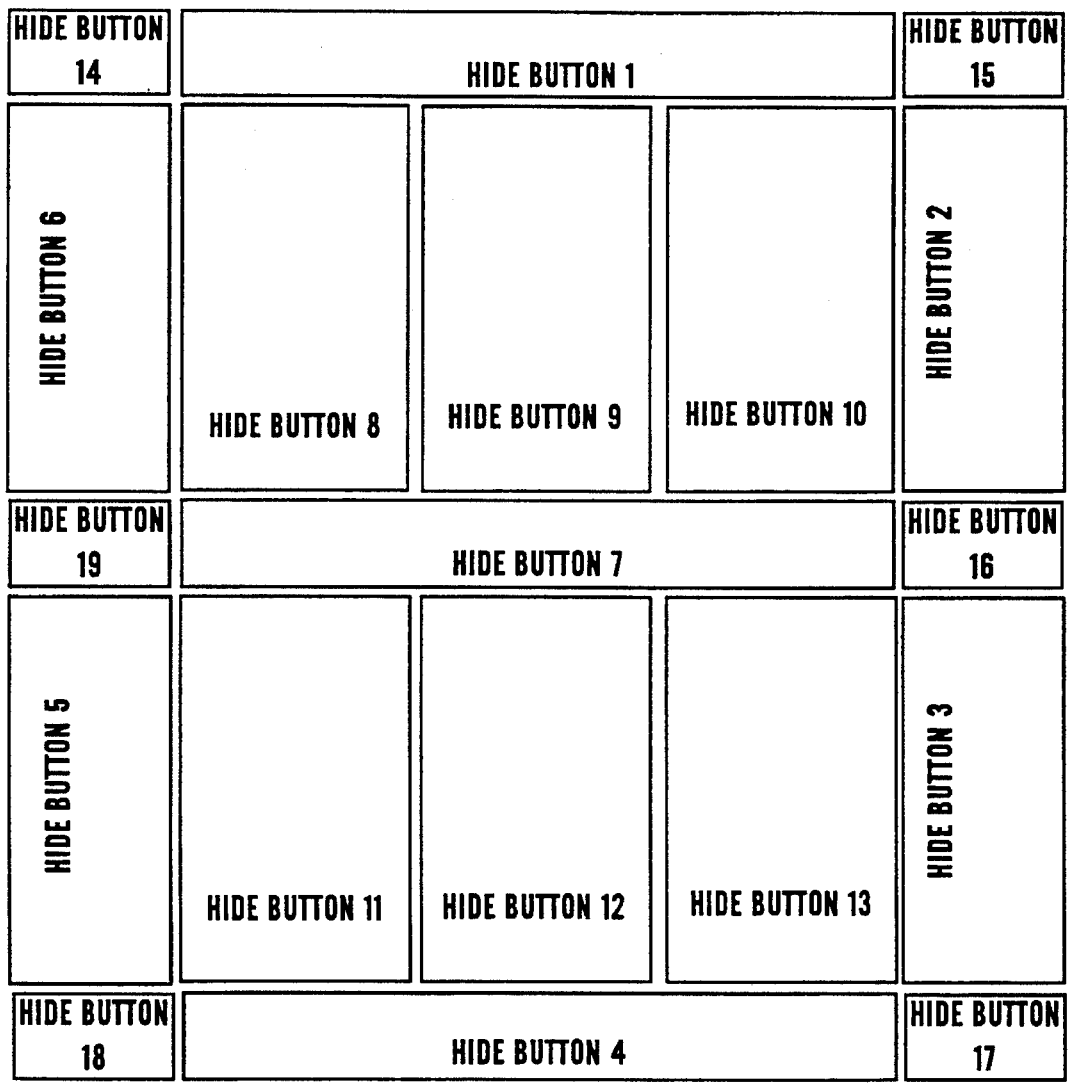
FIG. 2 shows a detailed identification of tile areas associated with display segments of the mosaic shown in FIG. 1.

FIG. 2 shows a detailed identification of the tile areas associated with the various display segments of the mosaic 16. The nineteen tile areas associated with the 19 segments of the mosaic display are associated with 19 "hide buttons", or hidden keys, respectively associated therewith. Thus, it will be appreciated that hide button 1 is in fact larger than the upper horizontal display segment 18 of the mosaic display 16. Similarly, hide buttons 10 and 13 cover larger areas than the slanted segments at the righthand side of the interior of the mosaic display. It should be appreciated, however, that the illustrations in FIG. 2 are symbolic only and that the hinge tile areas for example, which are represented by hide buttons 14–19, may in fact be larger than illustrated. In general, the enlarged hide buttons are provided in order to improve results for operator activation, so that stylus placement need not be as precise as placement on a display segment in order to enter data.

In accordance with the invention, the various combinations of hide buttons used to input particular characters are illustrated in FIG. 3. The figure provides a contact table wherein the hide buttons activated in a first operation, or by a first click using a mouse, are shown in the column along the left side of the table and wherein the hide button operated in accordance with a second operation, or in accordance with a second click associated with a mouse, are shown along the upper row of the table. At intersections of the rows and columns are shown the characters represented by the two clicks, or contacts, wherein the two inputted tile areas are represented by the row and column at each respective intersection.

Thus, as noted in the previous examples, the letter "P" is inputted by double clicking the hide button 17 corresponding to the lower righthand hinge segment, or by twice contacting the tile area represented thereby. Similarly, inputting the character "C" is implemented by double clicking on the hide button 16, corresponding to the hinge tile region in the center of the righthand vertical portion of the display. On the other hand, the character "H" is inputted by contacting the tile areas corresponding to hide buttons 1 and 4, or by operating hide buttons 4 and 1. The letter "K" is inputted by operating hide buttons 9 and 10; 9 and 13; 10 and 9; 13 and 9; 10 and 13 or 13 and 10.

In order to input numerical characters, it is noted that some numerical characters may be confused with alphabetic letters. Thus, a hide button 20, associated with special purpose segment 24 in FIG. 1 (not shown in FIG. 2), may be used to indicate that the inputted character is numeric. For example, in order to input the numeral "2", it suffices to extinguish the segments of the default figure-8 mosaic display corresponding to hide buttons 6 and 3, in either order. This combination of hide buttons, tile areas and display segments does not correspond to any of the combinations associated with the alphabetic letters. Similarly, in order to input the numeral "3" from the default figure-8 mosaic display, it suffices to extinguish the left vertical display segments associated with hide buttons 5 and 6. Towards that end, it should be appreciated that hide button 19 may not be used as, in accordance with the previous definition of hinge elements, contacting button 19 also extinguishes the segment associated with hide button 7. However, hide buttons 19 and 4 may be used to input the number "7". Each of the foregoing illustrates input numerals which are explicitly identified, and which are not confused with any input letters of the alphabet.

However, in order to input the numeral "5", contacts with hide buttons 2 and 5 might be confused with the letter "S". Thus, in accordance with the invention the numeral "5" is encoded by contacting hide button 5 together with the special "numeral" key, represented by hide button 20.

To the extent practicable, the various entries in the press combination table shown in FIG. 3 are selected to simplify the input operation by selecting for contact specific tile areas associated with segments of a display to be extinguished (or illuminated) in order to change the mosaic display of the template from a default figure "8" to the inputted character. Alternative press combinations may be devised if the template starts from a blank display in which all segments are extinguished, in order to build up the character being inputted. In either case, provision and display of a template (whether as illuminated display segments or borders of extinguished segments) limits the complexity of the program needed to implement recognition of the input character, guides the user to appropriate contacts with enhanced reliability, and thus improves both speed and reliability of the recognition process.

It should also be appreciated that various press combinations in FIG. 3 which are blank, and do not have entries, may be designated to represent any character or additional function. Further, although not illustrated therein, short cut combinations may be added to the table to speed the input process. Thus, double-tapping, or double-clicking, only the upper horizontal segment may be used to input an "H". This added feature would be represented by entering the letter "H" at the intersection of the first row with the first column in FIG. 3.

An advantageous feature of the invention, however, is the provision of input tile areas corresponding to display segments for the character being inputted, wherein primarily it is the tile areas corresponding to the display segments for a particular character which are contacted, or operated, for inputting that character. Thus, the embodiment of FIGS. 1–3 enables virtually intuitive visualization by the operator of the input codes, or segments to be contacted, and enables quick memorization of the sequence of input operations required for inputting the various characters, thus enhancing the speed at which characters may be inputted to the data processing apparatus.

Figure 4:
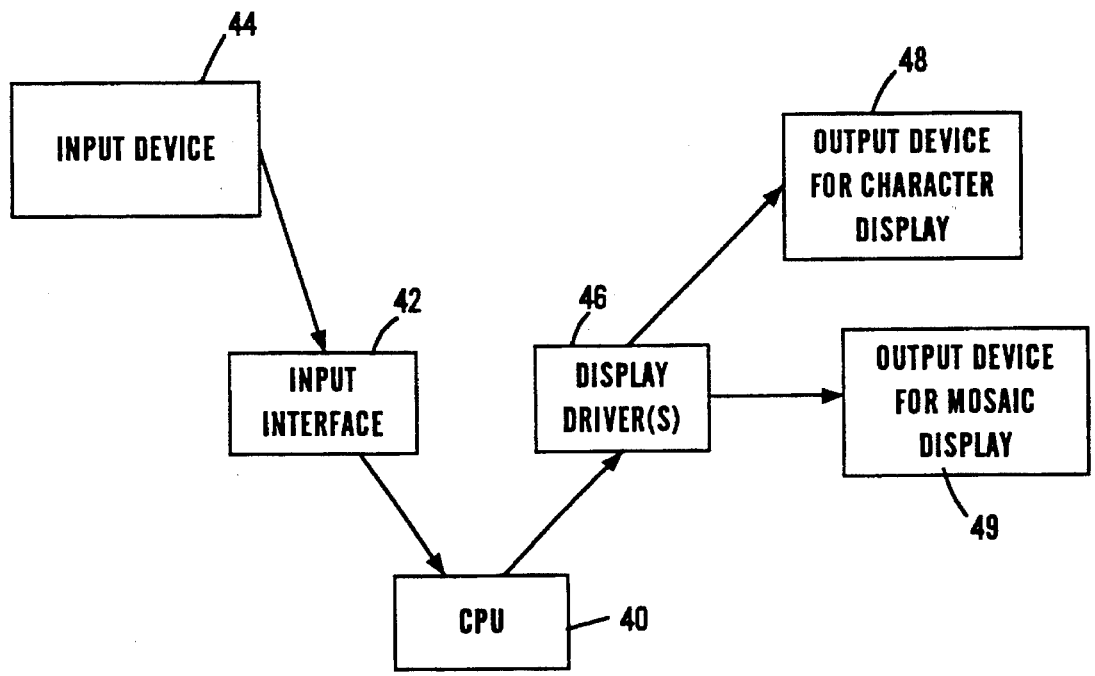
FIG. 4 is a block diagram of a data processing apparatus for implementing various embodiments of the invention.

Referring now to FIG. 4, shown therein is a block diagram of a data processing apparatus for implementing the various embodiments of the invention. Specifically, a central processing unit (CPU) 40 is programmed to respond to various inputs in order to recognize the input character and to generate a display thereof. Thus, an input interface 42 provides input signals to the CPU indicative of various operations of the input device 44.

As previously noted, any input device may be used, whether a movable input means such as a pointer, a stylus or the like, or a movable beam of radiation (such as optical, infrared, electromagnetic, sonic or the like), or even an operator's finger. Based on particular tile areas contacted by the input device 44, input interface 42 provides particular signals to the CPU 40. Upon receiving appropriate signals and recognizing the inputted character, CPU 40 operates display drivers 46. Although not shown, it is understood that the recognized characters, and the text message being generated thereby, are stored by the CPU 40 in a storage device which may be internal (such as a RAM or a register) or external (such as magnetic or optical media).

A primary function of the display drivers 46 is to generate a display of the inputted character on an output device 48. Thus, in the embodiment of FIG. 1, display drivers 46 generate a text message 14 for display on the display screen 12. As a separate function, display drivers 46 also respond to CPU 40 to operate output device 49 for the mosaic display. In the embodiment of FIG. 1, this function of the display drivers 46 corresponds to modifificial of the mosaic display 16, which is altered in response to each operation of a tile area by illuminating or extinguishing the display of one or more of the segments 18 and 20, thus confirming to the user the inputted segments.

It should be appreciated, however, that an experienced operator will not need the confirmation display wherein individual segments of the mosaic 16 are illuminated or extinguished in response to operation of the various hide buttons or contact with the various tile areas. By eliminating the additional software processing necessary to implement such display modification by display drivers 46 on output device 49, processing of data inputs in accordance with the invention is expedited and the character display is more quickly implemented on output device 48.

Figure 5:
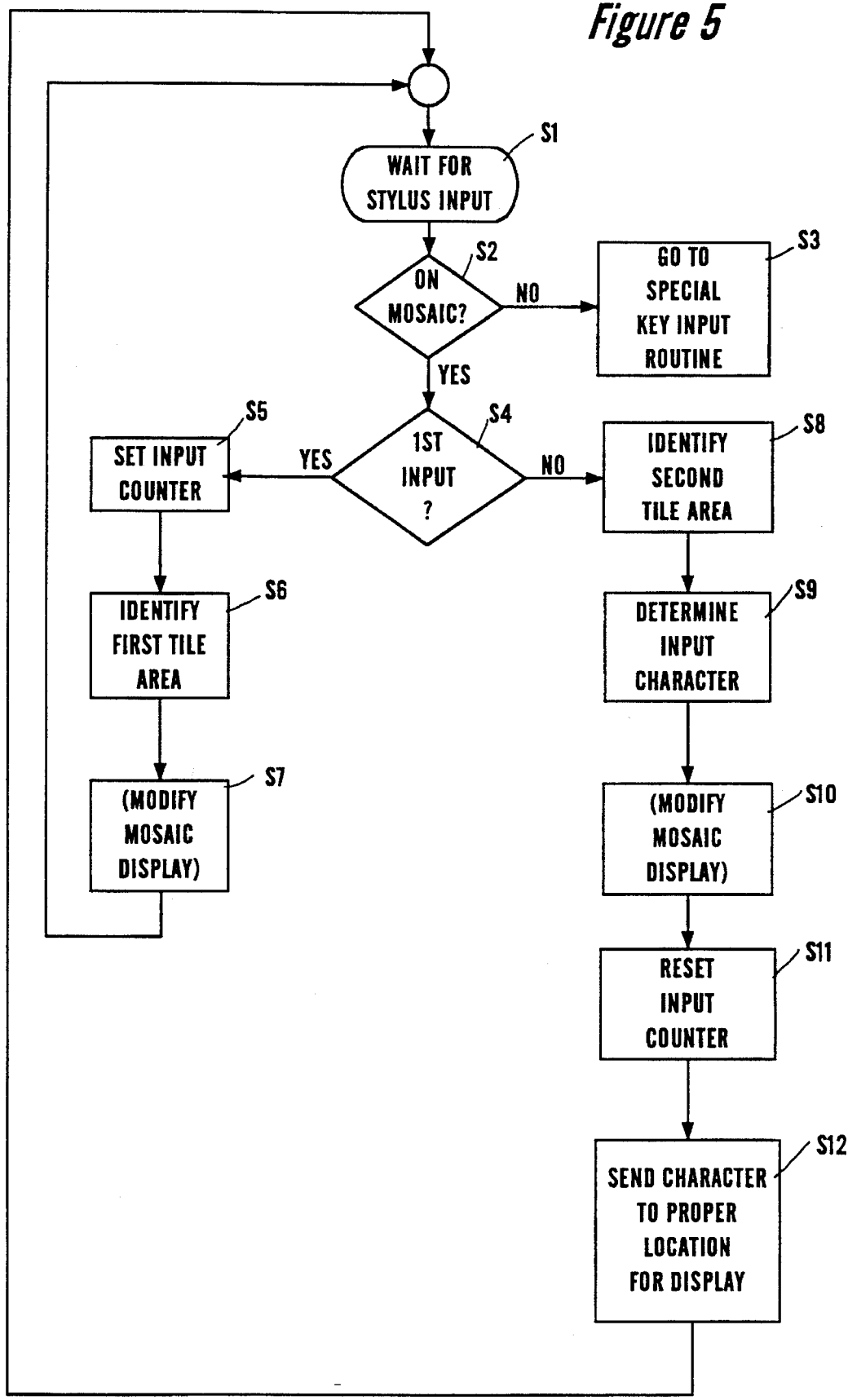
FIG. 5 is a flow chart implementing an embodiment shown in FIGS. 1–3 in the apparatus of FIG. 4.

Referring now to FIG. 5, there is shown a Flow Chart used in controlling CPU 40 of FIG. 4 to implement operation in accordance with FIGS. 1, 2 and 3. Specifically, at Step S1, the CPU waits to receive a stylus input. Upon receiving an input, at Step S2 the CPU determines whether the detected stylus position is on the mosaic 16 or elsewhere. If the input is determined to be elsewhere than on the mosaic display itself, i.e., at locations different from tile areas 18, 20 and 22, a "special key" input routine is executed at Step S3. This routine determines whether the stylus is positioned on a speciala tile area associated with a special purpose segment such as 24, and is elsewhere explained herein.

Upon determining that the stylus is, indeed, positioned on the mcsaic, at Step S4 the CPU is programmed to determine whether the received input is the first input for a particular character. Such a determination may be accomplished by checking a counter. When it is determined that the input received is, indeed, the first input, the input counter is set (or incremented) at Step S5 and the first tile area operated by the operator is identified at Step S6.

If the embodiment is one wherein the mosaic display 16 is modified by changing the illumination status of the operated segment, such modification is implemented at Step S7. Thereafter, control returns to Step S1 to await the next stylus input. For an embodiment wherein display segment illumination is not modified in response to selection of the segment, control reverts to Step S1 directly after execution or Step S6.

When the next stylus input is received and is determined at Step S2 to be on the mosaic, the result of the inquiry at Step S4 will be negative in view of the prior setting of the input counter at Step S5. Thus, Step S8 is implemented to identify the second inputted tile area determined by the stylus. Upon identifying the second tile area, the CPU determines the inputted character at Step S9, by referring to a stored data table for example, as illustrated in FIG. 3. Again, if the embodiment is one which modifies the illumination status of various segments of the mosaic display such modification is implemented at Step S10. For embodiments in which no modification takes place, control moves directly from Step S9 to Step S11.

At Step S11, the input counter is reset, so that the next stylus input will be treated as a first input. At Step S12, the determined character is sent for display at the proper location of the displayed text message 14. Alternatively, where the data processing apparatus transmits the detected characters to a utilization device, execution of Step S12 is implemented by transmitting the recognized character to the utilization device. Thereafter, the CPU returns to execution of Step S1 and to await the next stylus input.

Figure 6:
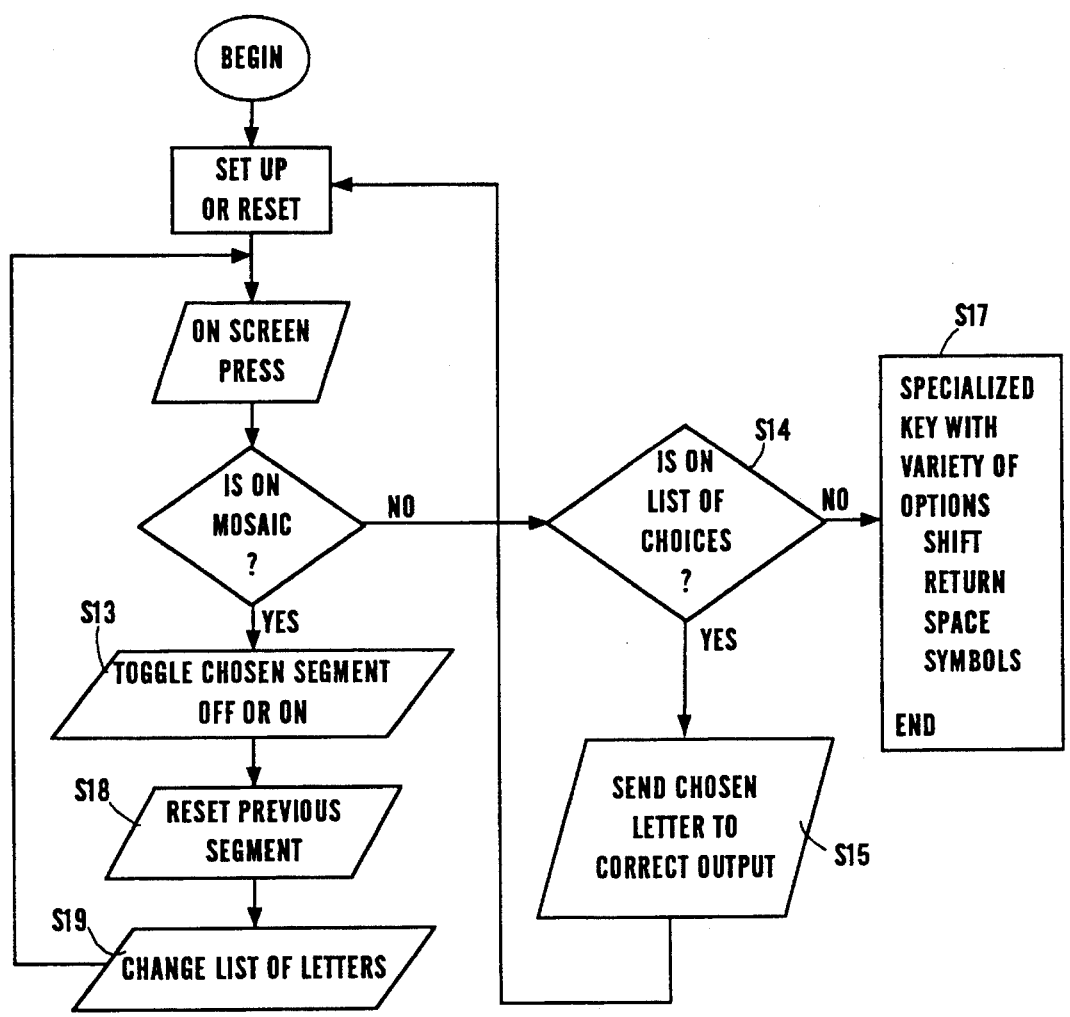
FIGS. 6–8 provide alternate embodiments of the invention as modifications of the flow chart of FIG. 5.
Figure 7:
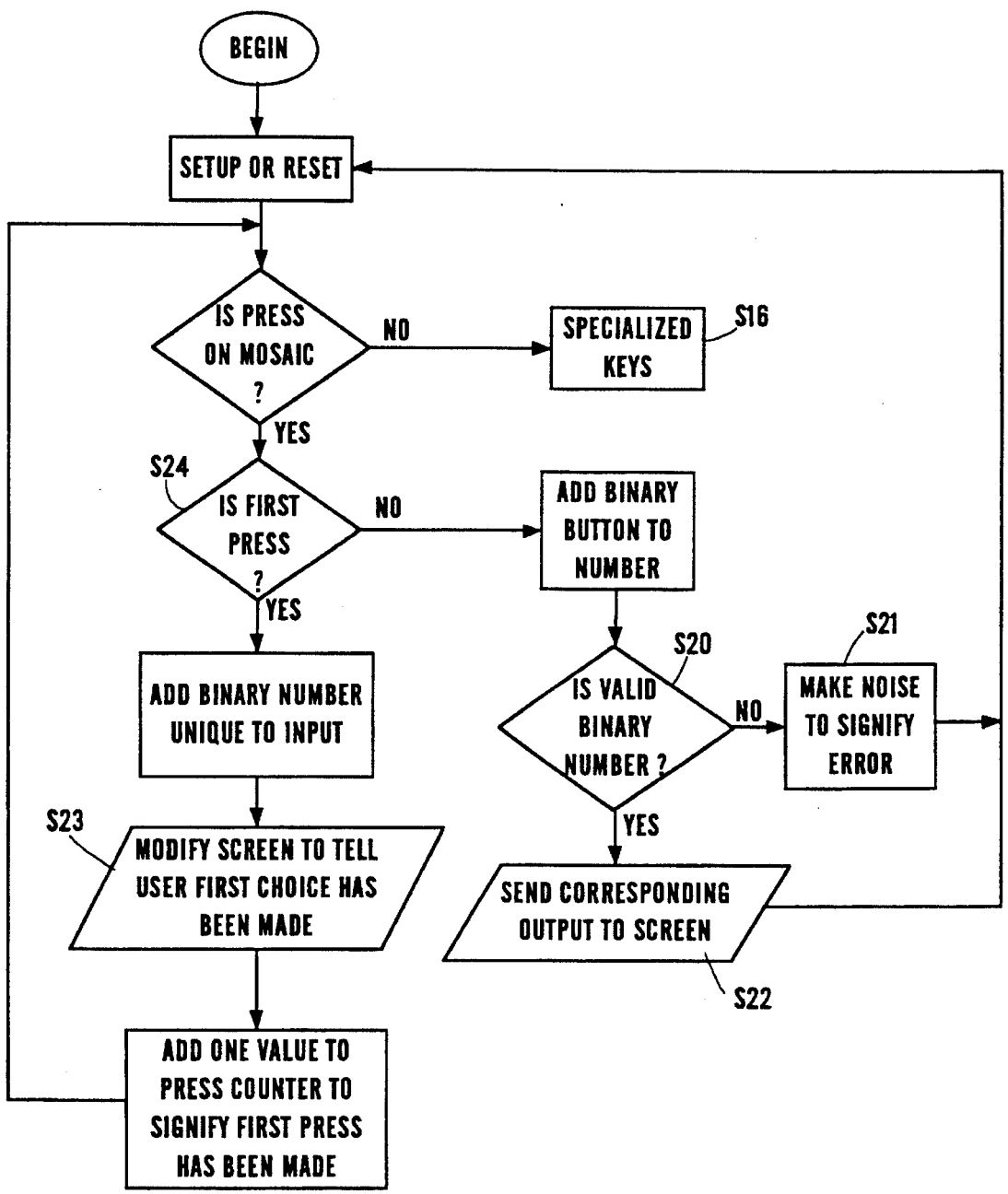

FIGS. 6, 7 and 8 provide Flow Charts illustrating various modifications in the manner of controlling the CPU 40 to operate in accordance with various aspects of the invention.

Thus, in the embodiments illustrated in FIGS. 6 and 8, there is provided a control system which generates a list of possible input characters based on the extinguished or illuminated segments of the mosaic display, as inputted by the operator using the stylus to provide inputs to the various tile areas. In each of the Flow Charts of FIGS. 6–8, the display is first set up, i.e., reset to its original state. Upon detecting a stylus input, or "screen press", the CPU is controlled by each of the Flow Charts to determine whether the stylus input is on the mosaic input segments, similarly to Step S2 in FIG. 5. In each of the embodiments of FIGS. 6 and 8, an affirmative result to this determination leads to toggling off or on at a Step S13 the segment chosen by the operator, i.e., changing the illumination status thereof, and thus displaying the selection of that segment. If the stylus input is detected to be not on the display segments of the mosaic, i.e., not to be in the area of the mosaic, the embodiments of FIGS. 6 and 8 both determine, at Step S14, whether the stylus input in fact is provided at tile areas on which are displayed the list of possible characters being inputted.

As previously noted, such a list may be generated after the first (or subsequent) stylus inputs. For example, from the table of FIG. 3, it is clear that if the first selected tile area corresponds to hide key 2, the list of possible input characters is limited to the letters "B", "G", "E", "S", "M" or "F", or the numeral "6". If the first tile area is selected in accordance with hide button 4, the list of possible input letters is smaller than that provided by selection of hide button 2, and is limited to the four letters "H", "P", "A" and "Q", and the numbers "9" and "7".

When a list of possible characters is generated, upon detecting that hide button 2 was the first input, the invention generates a list of letters "B", "G", "E", "S", "M" and "F". On the other hand, if the first input is due to hide button 4, the list of input letters is "H", "P", "A" and "Q". The possible input numerals may or may not be included in the list. Further, the characters in the list may be arranged according to frequency, according to alphabetical order, or according to any other criterion.

When such a list of possible input characters is generated, the second stylus input may be used to select a tile area associated with the individual letters displayed in the list. As the list is separately displayed from the mosaic display itself, operator selection of the character list in accordance with the embodiments of FIGS. 6 and 8 results in a negative response to the question of whether the selected segment or tile area is on the mosaic, and in a positive response to the question of whether the selected tile area is on the list of choices. It is thus a straightforward matter to identify the letter displayed at the position on the list which is selected by the stylus input and, at Step S15, to send the chosen letter to the correct output position for display.

If the determination at Step S14 is negative then, as in the embodiment of FIG. 5, it is concluded at Step S16 that specialized keys were selected. As previously noted, such specialized keys may represent various punctuation marks, case shifting operations, spaces, carriage returns or other symbols, as noted at Step S17 in FIG. 6. Thus, Step S3 of FIG. 5, and each of Steps S16 of FIGS. 7 and 8, implements a routine wherein the particular symbol or operation is identified by determining the location of the stylus input and, for example, comparing the same with locations of a number of displayed special keys, such as a space key, a shift key, a return key, or punctuation keys and the like.

In the embodiment of FIG. 6, after execution of Step 13, in order to identify the selection of a particular segment, a Step S18 resets previously displayed segments and, at Step S19, the list of letters is changed in accordance with the segment selected by stylus input. It should be appreciated that the embodiment of FIG. 6 thus permits particular letters, or characters, to be inputted with two (or less) stylus operations. However, if an operator does not utilize the list of possible characters being inputted, provided at Steps S19 and S14 for example, then more than two entries may be required. Such operation is specifically contemplated in the embodiment of FIG. 8. Therein, as well as in the embodiment of FIG. 7, unique binary numbers represent each specific tile area (input segment). Sums of two binary numbers resulting from two opertions of the inventive apparatus are thus unique numbers identifying the two operated tile areas, and enable the CPU to identify the inputted character and generate a corresponding output for display. The binary numbers are added at each input operation and a determination may be made at any time whether the resultant sum is representative of a valid possible character. In the embodiment of FIG. 7, a Step S20 determines whether the resulting sum is valid. If it is determined that the resulting number does not represent a valid number, i.e., is not a number which can lead to recognition of a valid input character, a Step S21 is executed to generate an alarm, illustratively indicated in that step as an audible (noise) signal to indicate occurrence of the error. The system is then reset to initiate operation anew. Alternatively, if the result of the test performed at Step S20 indicates a valid number, then Step S22 causes the character to be displayed on a screen. The text or numerical character is also added to the text message being formulated, for storage therewith. Thereafter, the input system is reset to detect the next character being inputted. In the flow charts of FIGS. 7 and 8, "set up" or "reset" includes resetting the internal binary counter tracking the binary numbers associated with the tile areas and the sums of such numbers representing plural inputs.

It should be noted that the above-described embodiments may include display of an icon in the character input process.

The embodiment of FIG. 7, which does not display a list of potential input characters, is intended to represent the specific embodiment wherein a selected segment is not displayed and, by elimination of the segment display routine, processing is expedited. In this embodiment, however, an indication is provided at Step S23 to alert the user to the fact that the second of two inputs is being implemented. Such an indication can be provided by automatic illumination or extinguishing of a particular display button, responsive only to the determination made at Step S24 that this is not the first input, and is preferably provided irrespective of the particular segment being inputted.

It should be recognized that each of the embodiments of FIGS. 5, 6, 7 and 8 may utilize the table of FIG. 3 to identify the character being inputted. However, other combinations may be used. As previously noted herein, the combinations relied upon in the table of FIG. 3 are selected in order to simplify memorization by the user of the sequences and/or combinations of tile areas to be activated for inputting specific characters. This goal is attained by selecting for representing a specific character those tile areas corresponding to segments used in display of the specific character. Of course, since the number of combinations of two segments is limited, for some characters the table used in FIG. 3 represents a combination of segments which would be activated in displaying a lower case representation of the inputted letter or character, while in other cases, the combination of tile areas represents segments of the upper case display of that letter. Thus, to input the letter "B", hide buttons 1 and 2 are activated or, alternatively, hide button 15 representing a hinge element is activated, corresponding to activation of the two hide buttons 1 and 2. In either case, when one contemplates the result of such activation on a default figure 8 mosaic display, the result is a lower case "b". Similarly, to input the letter "D", the table of FIG. 3 indicates activation of hide buttons 1 and 6, or the hide button 14 representing the hinge element, to result in a lower case "d". The specific combinations utilized in the combination table of FIG. 3 do not affect operation of the invention. However, the specific selections illustrated in FIG. 3 were selected specifically to provide a "user-friendly" apparatus, which is simple to operate, easy to master, and quick to learn.

As will be appreciated from the proceeding description, the various embodiments hereinabove described for the inventive data processing system operate to recognize an input character based on first and second, or initial and final, inputs provided to first and second (or initial and final) tile areas.

Two types of tile areas are provided, including a first type representative of an input identifying a single segment of the mosaic display provided as a template, and a second type corresponding to the hinge tile areas, representing inputs identifying a plurality of segments of the template. However, in yet additional embodiments of the invention, the foregoing is improved upon by responding to identification of a pair of tile areas at the beginning and end of a single stroke of the stylus, rather than by requiring discrete input taps, touches or the like, to the individual tile areas.

In a further modification, the apparatus responds to the initial point and the direction of the input stroke in order to identify the character. In these stroke-sensing embodiments, the character may be identified upon recognizing that the stroke crosses over (i.e., intersects) a segment of the template represented by a particular tile area of the template, rather than by relying only on the specific point of initial contact and a release point between the stylus and the input surface. By eliminating a requirement for a double-tap input, the stroke-sensing embodiment increases the operator's input speed.

As previously noted, different template configurations may be used in conjunction with the invention. Accordingly, FIG. 9 shows one such modified template configuration. The description of the stroke-sensing embodiments of the invention may be understood from the following examples provided with respect to the template configuration of FIG. 9. As illustrated therein, the mosaic display used in the template includes nine segments, represented by nine tile areas, including three horizontal tiles (0, 6 and 3), a pair of vertical tiles (1, 2) at the right side of the template, a pair of vertical tiles (5, 4) at the left side of the template, and a pair of vertical tiles (7, 8) internal to the template.

As with the previously described embodiments, the strokes selected for encoding or representing individual letters being inputted by the device are strokes forming at least a portion of the character represented thereby, i.e., strokes which would be used in writing the character using pen and paper. Examples of the stroke representations for particular letters are shown in FIGS. 10–13. As will be appreciated, the stroke used to encode, or represent, the letter "H" is a downward stroke from tile 5 to tile 4, as shown in FIG. 10. The stroke used to represent the letter "N" is shown in FIG. 11 as a stroke from tile 5 to tile 6. FIG. 12 shows a stroke selected to represent the letter "M" as a stroke from tile 5 to tile 7. FIG. 13 illustrates a stroke corresponding to the letter "C", as a curved line from tile 0 to tile 5.

Thus, when using a stylus in conjunction with the displayed template, an operator forms the letter "M" for input by drawing a diagonal line from tile 5 to tile 7, forms the letter "N" by drawing a diagonal line from tile 5 to tile 6, etc. Where the inventive apparatus is implemented using a non-touch-sensitive screen, i.e., wherein the input is provided separately from the display surface for the template, similar strokes may be inputted using a mouse, roller ball, joy stick or other pointing device used to position and direct movement of a cursor on the display surface of a PC display which is also used to display the template.

While PDA's may incorporate control software for recognizing a particular tile even if the stylus is set down at a location which does not completely correspond with the tile, the present invention provides for recognition of the correct, or intended, tiles as part of its implementation on a personal computer for example. Thus, as shown in FIG. 14, each of the tile areas may in fact have a shape modified from the displayed segment represented thereby. The extended shape of tile 6 is shown by dashed lines in FIG. 14. It is the extended shapes which are used by the implementing software to check for hits. Whether specific sensing areas of a display screen, such as a touch sensitive screen, are used as the tile areas, or whether it is the position of an externally controlled cursor, definition of a tile area need not duplicate the display segment represented thereby. Thus, by extending the tile areas beyond the borders of a display segment, greater latitude is given to an operator in selecting a particular segment of the template as the input segment. As illustrated in FIG. 14, the extensions do not need to be symmetrical, although they may be symmetrical.

In recognizing the character being inputted, the inventive apparatus first determines the location of the "pen-down" event initiating the stroke and subsequently determines the location of the "pen-release" event terminating the stroke. Further, the stroke itself is captured, i.e., the coordinate locations of the points on the stroke are stored, in order to be able to recognize the direction of the stroke.

As previously noted, internal control of a PDA such as the "Newton" captures and stores the stroke coordinate information. The control program for such a PDA further identifies a particular inputted tile area upon recognizing occurrence of a pen-down event, even if the pen does not accurately contact the intended tile area. In such a device the identified tile area is the closest tile area to the location of the pen-down event. When the invention is being implemented on data processing devices which do not include such known, built in, control processes, similar controls may be incorporated in the implementing devices in a straightforward manner.

In that regard, coordinates of the points constituting an input stroke may be stored either in absolute terms, relative to an arbitrary origin on the input surface, or in relative terms. For example, the coordinates may be taken with respect to an origin defined at the location of the pen-down event, i.e., an origin located at the initial point of the stroke. Thus, for a stroke starting at a particular point in tile 5, the coordinates of the points forming the stroke are stored relative to a coordinate plane in which the origin (0, 0) is e.g., near the upper left hand corner of tile 5, with x-coordinates increasing horizontally to the right and y-coordinates increasing vertically downwardly.

Figure 16:
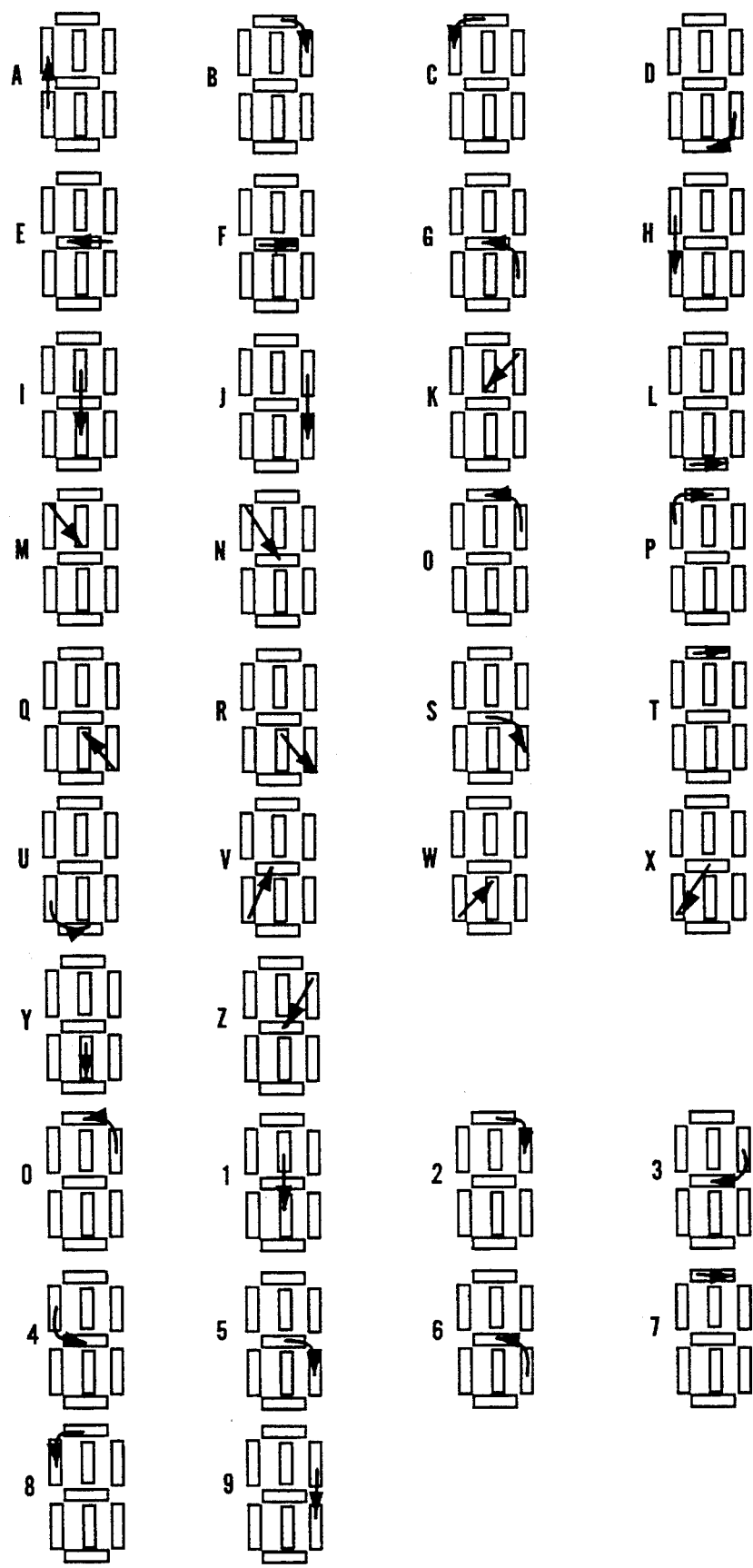
FIG. 16 shows a set of single stroke representations for the letters "A" through "Z"

As a form of error-correction, let it be assumed that the user intends to input the letter "H" by providing a stroke of the type shown in FIG. 10, which is initiated at tile 5 and terminates at tile 4. However, if the stroke is recognized as being downwardly drawn but does not quite reach tile 4, error-correction in accordance with the invention responds to the downward direction of the stroke and to the fact that the only strokes recognized as character inputs, and which initiate with a pen-down event on tile 5, are the strokes illustrated at FIGS. 10, 11 and 12. Indeed, in accordance with the preferred embodiment, the input strokes used to represent each of the letters "A" through "Z" are illustrated in FIG. 16. In that regard, it should be appreciated that the inventive concept permits representation of a character by alternate strokes. Accordingly, the letter "O" is shown as being represented either by a stroke starting on tile 1 and curving to tile 0, or by a stroke starting on tile 3 and curving to tile 2. Thus, it is apparent that, with the aid of the displayed template, each input stroke is limited to representation of a small subset of the possible input characters. As another example, it is apparent from FIG. 16 that only four input characters, the letters "J", "K", "O" and "Z", are represented by strokes starting on tile 1. Thus, once a determination is made that the pen-down event took place at tile 1, upon referring to FIG. 16 identification of the direction of the stroke as being vertically downwards immediately identifies the input character as the letter "J", rather than the letters "K", "O" or "Z".

Accordingly, the embodiment of the invention illustrated by FIGS. 9–16 features an abbreviated, single stroke, entry for each alphabetic character, in which the inputted character may be recognized either by identification of the location of the initial and terminal points of the stroke or by identification of an initial point and the slope of the stroke. It should be easily appreciated by those of ordinary skill that, in a similar vein, recognition may be implemented by identification of the terminal point of the stroke and the slope.

As is also apparent from FIG. 16, some of the alphabet characters are represented by strokes which are drawn only on a single segment of the mosaic display, or inputted only to a single tile area of the template. For example, the letter "A" is represented by an upward vertical stroke on tile 4, the letters "E" and "F" being represented by single strokes on tiles 0 and 6, respectively, etc.

It is thus the relative position and direction of the stroke with respect to the tile areas of the template which is used to distinguish and identify the input character for recognition. Clearly, if a template were not involved, it would be impossible to differentiate between the strokes used for inputting the letters "H", "I", "J", "P", "T" and "Y" in accordance with the representations shown in FIG. 16, since each is only a single downward vertical stroke. Nor would it be possible to differentiate between "V" and "W", which are each represented by au upwardly slanting stroke to the right, or between "X" and "Z" which are each represented by a downwardly slanting stroke to the left. Each of the groups above noted includes characters whose inputs are represented by a stroke having a substantially common direction. Without the orientation and relative positioning provided by a template, the strokes representing the different characters in each of the groups could not be differentiated from one another and thus more complex input sequences would be required to enable a data processing device to recognize the inputted characters.

Thus, the inventive combination of a template with a direction recognizing input device advantageously requires less complex input sequences, which are inputted in shorter time periods and are easier to remember, and which require less complex recognition circuitry and less storage for processing.

Figure 17:
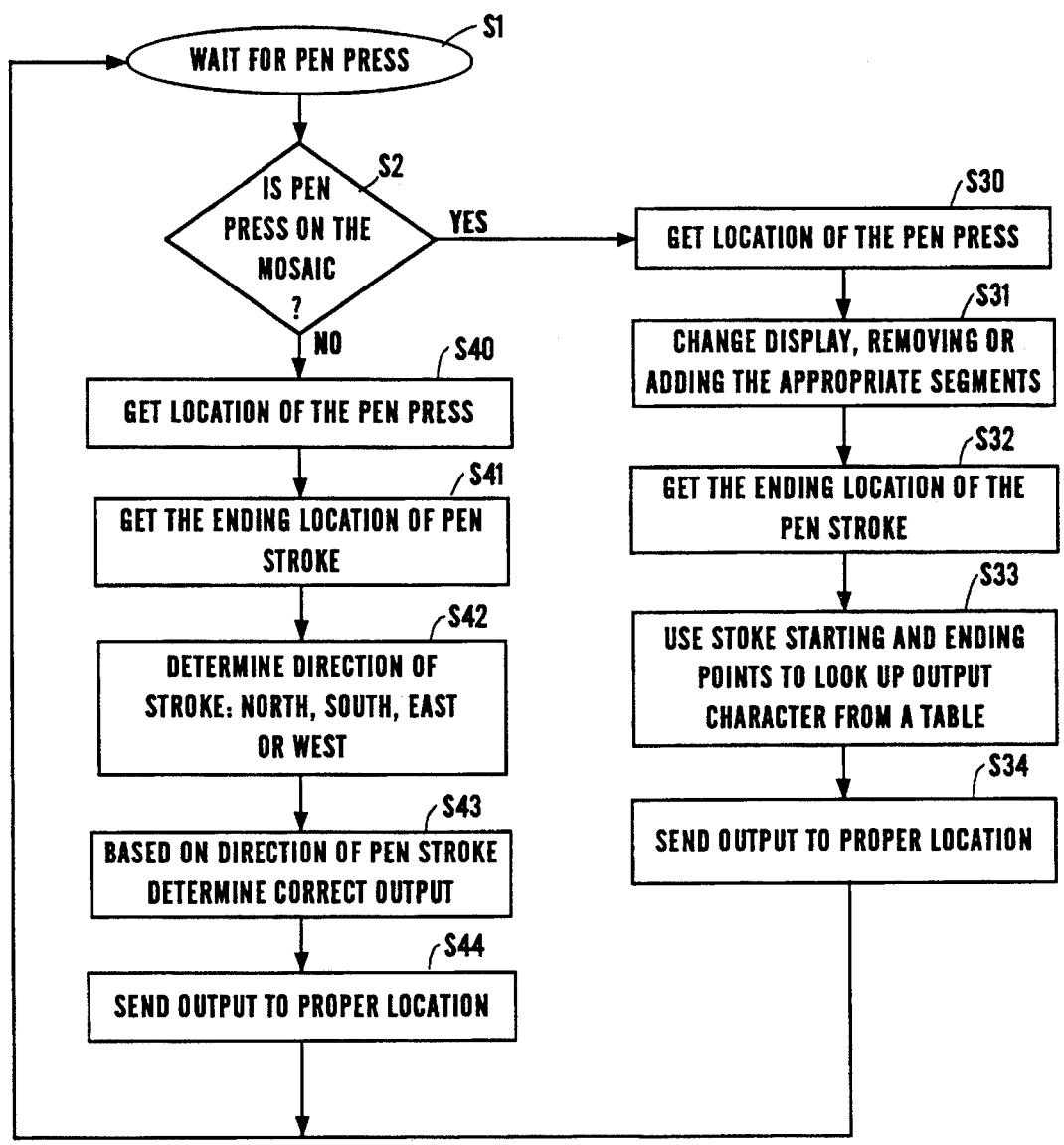
FIG. 17 is a flow chart for implementing a stroke input embodiment of the invention.

In accordance with the invention, character recognition may proceed in the manner illustrated by the Flow Chart of FIG. 17. Similarly to the Flow Chart of FIG. 5, the control apparatus waits for a stylus input, or pen press, at Step S1 and, upon receiving such an input, ascertains at Step S2 whether the inputted stylus contact is on the mosaic. If so, at Step S30, the apparatus according to the invention obtains the location of the pen press, i.e., of the initial point of the stroke. As above noted, using known techniques, if the initial pen press is not directly on one of the tile areas of the template, the system can assign a nearest tile area thereto, at either of Steps S2 or S30. In accordance with the optional embodiment wherein the mosaic displayed in the template is modified, particularly by changing the state of illumination of the segments corresponding to the detected tile areas, Step S31 then changes the display by removing or adding the appropriate segments thereto.

Thereafter, upon detecting the end of the stroke, the system determines the location of the stroke end at Step S32. In this regard, it is noted that the locations of the initial and terminal points are identified with respect to particular tile areas, thus enabling reference to the predetermined assignments of locations to characters, as shown in FIG. 16, to identify the input character at Step S33. Of course, a table identifying the assignments of FIG. 16 may be stored in read only memory, random access memory, or external memory. Execution of Step S33 accesses such a stored table in order to identify the character. At Step S34, the apparatus causes display of the identified character at the appropriate location on the display, and returns to Step S1 to await the next pen press.

As previously noted, the present invention provides character recognition in response to only the initial and end points, as relied on at Steps S30–S33, or in response to only a single point and the slope, or directional, characteristic of the stroke. Thus, if it is determined at Step S2 that the stylus is not directly on the mosaic, Steps S40 and S41 obtain the locations of the initial and terminal points of the stroke. If one of these points is coincident with one of the tile areas, that point and the direction of the stroke is relied upon to identify the inputted character. In the previously described example, it was considered that the initial point is accurately presented on one of the tile areas. Thus, for such a condition, Step S40 obtains a particular tile area while Step S41 may result in no returned pen location, if the stroke does not extend to (and terminate on)the expected terminating tile area. At Step S42, the direction of the stroke is determined, such as a north, south, east or west direction.

Of course, the direction need not be limited strictly to vertical and horizontal directions but may also identify the slope of the stroke, whether within particular ranges or absolutely. As will be appreciated from the illustrations at FIG. 16, several strokes (such as used to represent letters "B", "C", "D", "G", "O", etc.) include curved portions, while other strokes are substantially linear. Obtaining directions in Step S42 is straightforward for the linear strokes. The direction may be obtained from the differences between coordinates of the initial and final points, or from differences of coordinates of points at a central portion of the stroke, or as an average value of coordinate differences at a number of points on the stroke. Such computations are straightforward and easily implemented in a "delta-y delta-x" computation.

However, for the strokes including curved portions, the definition of the term "direction" may not be immediately appreciated. The following examples are presented for clarification. Although specific characteristics of curvature may be obtained in a fairly straightforward manner, such as by ascertaining the radius and direction of curvature, in fact a simple computation analogous to that of the linear strokes suffices for the examples selected in FIG. 16 to represent the various input characters. Thus, by properly selecting the strokes used to represent the input letters, as was done for the arrangement of FIG. 16, it is sufficient to determine the initial slope (or the final slope, or the slope at some intermediate points). Thus, for strokes beginning at tile 2, it is sufficient to identify the initial stroke as being vertically downward, thereby to identify the inputted letter as a "D" rather than a "G".

On the other hand, for strokes beginning on the central horizontal tile 6, it is not sufficient merely to identify the direction as being horizontally to the right, if the terminal tile area is not clearly identified. It is noted, for example, that to input the letter "F", an input stroke is required which begins and ends on tile 6 while, to input the letter "S", the stroke must curve downwardly to terminate on tile area 2. Thus, identification of the specific input letter knowing only that the stroke is horizontal and begins on tile 6 requires more information than the initial slope.

For example, the specific location of the initial point in tile 6 may be relied upon. However, in keeping with the implementation of Step S42 of FIG. 17, the direction of the stroke may also be determined either from identification of the slope at several predetermined points along the stroke or from the difference in coordinates of the initial and ending point. In either case, a directional value is obtained in accordance with Step S42, which is not limited only to identification of the four directions listed therein. This information, together with the initial point, or with the ending point of the stroke, is used at Step S43 to identify the correct input character. Thus, the table stored in memory for identification of the input character from the stroke data preferably includes both the initial and final tile areas of the stroke, as well as a directional parameter related thereto, such as a direction or slope obtained from the difference in coordinates of the initial and final points.

Upon implementing Step S43 of FIG. 17, the character is identified and is then outputted at Step S44 for display at the appropriate location.

In operation, the stroke is captured by the data processing apparatus, which may generate an array including the x and y coordinates of each point in the stroke, or otherwise store the coordinates. Upon recognizing the starting tile assigned to the stroke, whether because the initial point is on the tile or is sufficiently close thereto, the invention thus permits recognition and identification of the input character either by identifying the ending tile or by identifying the direction of the stroke starting at the initial tile.

In that regard, although not illustrated in the Flow Chart of FIG. 17, it should be clear that other tiles which the stroke intersects are also identifiable from the coordinate array created upon capturing the stroke. This information may also be relied upon for identifying the intended stroke and thus the intended input character. Similarly, the tiles which the stroke comes close to intersecting, or which the stroke would intersect if extended, may also be identified from the coordinate array. Each of these easily determined tiles may be relied upon in identifying the input character, by slight modification of FIG. 17 in a manner easily implemented by one of ordinary skill in the art.

Indeed, it is quite possible that various combinations of the above determinations may be relied upon in identifying the input characters, with different combinations of features being relied upon to identity letters represented by strokes initiating (or terminating) on different tile areas. If the above information is not sufficient to identify the inputted letter, neither Step S34 nor Step S44 would output a character and control reverts to Step S1, where the process begins again.

In accordance with the foregoing, and as an illustration of the applicability thereof, if a stroke is drawn from tile 5 in the direction of tile 6 or 7, without intersecting or terminating on tile 6 or 7, it would be difficult to identify the inputted character as an "M" or an "N". As hereinabove described, however, upon determining that the stroke is not a vertical stroke representing the letter "H", the stroke may be mathematically extended (without displaying the extension) in a straightforward manner in order to identify the first tile to be intersected thereby. If a positive hit is found on either tile 6 or tile 7, then the appropriate output character ("N" or "M") is generated. If no hit is found, a character is not outputted and the system again returns to Step S1 to await the next input stroke.

Alternatively, if the stroke terminates externally to each of tiles 4, 6 or 7, for example, it is a straightforward operation needing no explanation to cycle through the coordinates of each point forming the stroke, from the first to the last, until identifying a point that falls within tile 7, thus representing an input "M", tile 6, representing an input "N", or tile 4, representing an input "H". As FIG. 16 identifies these as the only acceptable tiles on which a stroke beginning on tile 5 would terminate, the subset of input characters is thus simply obtained from FIG. 16 (here, "H", "M" and "N") in correspondence with the subset of acceptable tiles (here, 4, 6 and 7). The inputted character is thus identified as the character corresponding to the first tile of the subset of acceptable tiles which is intersected by the stroke, as described in this process. On the other hand, if this procedure fails to identify any tile to provide an exact match because none of the points forming the stroke are on one of the acceptable tiles, and because the extended stroke fails to intersect one of the acceptable tiles, it is contemplated that the system will operate as follows.

It should be noted that the following implementation is based on a combination of the following observations. Even if the stroke misses its terminal tile and its starting tile, the general shape and direction of the stroke remain substantially the same as contemplated in FIG. 16. Thus, the stroke would still be a curve, a diagonal line, a horizontal line or a vertical line in the appropriate direction. Accordingly, the invention compensates for such positioning errors, wherein the target or initial tiles (or both) are missed, by reference to the shape and direction of the curve. This process begins with FIG. 14, in which tile 6 for example is seen to be extended by a predetermined number of pixels, e.g. five pixels, thereabove. Thus, if a user draws a diagonal line from the segment represented by tile 5 to the segment represented by tile 6, but stops short of the display segment represented by tile 6, if the terminal point is within five pixels of the segment the invention nonetheless recognizes that terminal point as on the segment corresponding to tile 6. Similarly, by extending the tile areas as shown in FIG. 14, the terminal point may miss the tile area itself but still be recognized as corresponding to that tile area, provided it falls within the extended region indicated by the dashed line of the Figure. Accordingly, for the example under consideration, the invention identifies the input stroke as representing the letter "N". This approach is similar to the previously described "hide button" concept.

In another approach to accepting imprecisely inputted characters, Step S43 may in fact identify the slope of the stroke by comparing the same to slopes of calculated reference lines sharing the same initial point as the inputted stroke. Thus, as shown at FIG. 15, a first reference line is drawn (mathematically) from the actual starting point to the bottom left most point of tile 7. This line is shown at FIG. 15 as line number 1. A second reference line, shown as line number 2, is drawn from the starting point to the top left most point of tile 6. These reference lines thus identify boundary values for the slope of the actual stroke, so that if the slope of the actual stroke is less negative than that of reference line number 1, the stroke is determined to represent the letter "M". Indeed, such a stroke would first intersect tile 7 and this technique is thus related to the above-described procedure, wherein the input character is identified by extension of the stroke line to the first tile area intersected thereby.

On the other hand, if the stroke has a slope which is more negative than that of reference line 1 of FIG. 15, but less negative than that of reference line 2, the stroke is determined to, have intended to indicate an input letter "N" since the first tile to be intersected thereby would be tile number 6. Still further, if the stroke is downwardly oriented but has a slope more negative than that of reference line 2, this approach would identify the letter "H" as the intended input character. The letter "H" would also be identified as the input character if the stroke is generally downwards but has a leftward horizontal component. Indeed, a boundary stroke value is selected such that, for this example, the input character would be identified as "H" so long as the downward movement along the stroke is greater than the leftward horizontal movement therealong, i.e, if the absolute value of the difference in y coordinates of the stroke ("delta-y") exceeds the absolute value of the difference in x coordinates thereof (("delta-x"). Such a boundary criterion may be determined by trial and error for each particular letter, or may be universally set for all the letters.

To illustrate a situation wherein the initial tile is imprecisely inputted, it is noted that if tile 5 is the terminal tile, the problem is straightforwardly solved since only one stroke of FIG. 16 has tile 5 as its terminating tile, specifically the stroke corresponding to the letter "C", which is drawn as a curved line from tile 0 to tile 5. However, the control program for operating the CPU more precisely includes specific subroutines which handle a situation wherein the initial point is actually closer to tile 5 than to tile 0. Specifically, to identify the "C" input, the control code would preferably include a portion seeking to identify a number of characteristics of the particular stroke being guessed at. Thus, a positive change in the y coordinate, indicating that the stroke extends downwardly, is one criterion. A beginning-to-end change in the x coordinates of the stroke which is less than four, indicating that the ending point of the stroke is to the left of, or less than four pixels to the right of, the starting point is another criterion. A third criterion is identification of a condition in which the x coordinate of the halfway point of the stroke is less than the x coordinate of the starting point, i.e., is to the left thereof, combined with the y coordinate of the starting point being less than five. If a stroke meets each of the above criteria, the letter "C" is assigned thereto.

Thus, in the foregoing examples of error correction for strokes associated with tile 5, it is shown that first, the system checks for a hit with tiles 6, 7 or 4, followed by a check for the "C" stroke, followed by a slope analysis to discriminate between incomplete "M", "N" and "H" strokes. While the exact approaches and the order in which they occur will vary from tile to tile, the general principles and disclosed assumptions are applicable to strokes associated with each of the tiles.

As illustrated in the foregoing examples, in accordance with the invention simple mathematical criteria, which are easily implemented with minimal effort by those of ordinary skill, are used to ascertain the intended input character from incomplete, imprecise or otherwise imperfect input strokes.

The foregoing description of the preferred embodiment of the invention has been presented for purposes of illustration and description. It is not intended to be exhaustive or to limit the invention to the precise forms disclosed, since many modifications or variations thereof are possible in light of the above teaching and will occur to those of ordinary skill in the art. For example, various functions and special characters may be implemented with the aid of the stroke recognizing embodiment as follows.

A "space" key may be represented by an eastwardly (e.g., rightwardly) extending stroke, in areas to the left or right of the mosaic which may, or may not, include a separately displayed input tile area. Similarly, an input westwardly extending stroke may represent a "delete" key, a northwardly extending stroke may represent a "shift" key and a southwardly extending stroke may represent a "return" key.

In another modification, rather than providing only a single character input area, having only a single mosaic display as a template, a plurality of character input areas (template mosaic displays) may be provided.

All such modifications and variations are within the scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

We claim:

1. Data input apparatus for recognizing any of a plurality of characters inputted by an operator, comprising:

a character input region for inputting a single character;

said character input region including a plurality of sensors for sensing operator inputs and generating sensor signals indicative thereof and a plurality of predefined tile areas for sensing operator input of respective portions of the single character, each tile area including at least one of said plurality of sensors;

movable input means for providing operator inputs to any of said plurality of sensors by inputting data relevant to said tile areas;

analyzing means receiving said sensor signals for recognizing a character being inputted by the operator;

said analyzing means comprising:

first means responsive to said sensor signals for detecting an operator input to a first tile area representing a first portion of the character where said movable input means is first sensed by a sensor and generating a first tile identification signal indicative thereof;

second means responsive to said sensor signals for detecting an operator input to a second tile area representing a second portion of the character where said movable input means is secondly sensed by a sensor and generating a second tile identification signal indicative thereof; and third means responsive to said first tile identification signal and said second tile identification signal representing said first and second portions of the character for recognizing a character being inputted by the operator and generating a character signal indicative thereof.

2. A data input apparatus as recited in claim 1, wherein said movable input means comprises pen means.

3. A data input apparatus as recited in claim 2, wherein said pen means comprises generating means for generating electromagnetic radiation and each of said sensors comprises electromagnetic radiation sensing means.

4. A data input apparatus as recited in claim 2, wherein said pen means comprises generating means for generating infrared radiation and each of said sensors comprises infrared radiation sensing means.

5. A data input apparatus as recited in claim 2, wherein said pen means comprises means for detecting optical conditions and generating a detection signal indicative thereof, and each of said sensors comprises means responsive to signals from said pen means for sensing a position of said pen means in said character input region.

6. A data input apparatus as recited in claim 2, wherein said pen means comprises contact means for contacting said character input region and each of said sensors comprises contact sensing means.

7. A data input apparatus as recited in claim 2, further comprising display means responsive to said character signal for displaying the character recognized by said third means.

8. A data input apparatus as recited in claim 1, wherein said tile areas include a single set of tile areas for inputting only a single character, in a time sequence of singly inputted characters.

9. A data input apparatus as recited in claim 8, further comprising display means responsive to said character signal for displaying the character recognized by said third means.

10. A data input apparatus as recited in claim 9, wherein said third means responds to said first and second tile identification signals for identifying the character being inputted by the operator.

11. A data input apparatus as recited in claim 10, wherein said first and second tile areas are a same tile area.

12. A data input apparatus as recited in claim 10, wherein said first and second tile areas are different tile areas.

13. A data input apparatus as recited in claim 10, wherein said character input region further includes at least one hinge tile area receiving a single operator input and comprising means for detecting a single operator input to a hinge tile area and responding thereto by providing signals to a plurality of said tile areas, and wherein said first and second tile areas include a hinge tile area.

14. A data input apparatus as recited in claim 10 wherein said character input region comprises input display means for displaying a tile area inputted by an operator, said input display means comprising display segments corresponding to and adjacent to said tile areas for confirming to the operator an input corresponding to a desired tile area.

15. A data input apparatus as recited in claim 14, further comprising segment illuminating means for illuminating the display segments of said input display means, and segment extinguishing means for extinguishing illuminated display segments of said input display means, said segment extinguishing means responding to an operator input to a tile area by extinguishing a display of a segment corresponding to the inputted tile area.

16. A data input apparatus as recited in claim 15, wherein said character input region further includes at least one hinge tile area receiving a single operator input by a single operation of said movable input means, wherein said segment extinguishing means responds to said single operator input to a hinge tile area by extinguishing displays of a plurality of segments corresponding to a plurality of tile areas.

17. A data input apparatus as recited in claim 16, wherein said first means is responsive to said sensor signals for detecting an initial tile area where said movable input means is initially sensed by a sensor and generating an initial tile identification signal indicative thereof; said second means is responsive to said sensor signals for detecting a final tile area where said movable input means is finally sensed by a sensor and generating a final tile identification signal indicative thereof; and said third means is responsive to said initial tile identification signal and said final tile identification signal for recognizing a character being inputted by the operator and generating said character signal indicative thereof.

18. A data input apparatus as recited in claim 1, further comprising direction means for identifying a direction of movement of said movable input means and for generating a direction identifying signal indicative thereof, said third means responding to said direction identifying signal, said first tile identification signal and said second tile identification signal for recognizing the character inputted by the operator.

19. A data input apparatus as recited in claim 18, wherein said direction means comprises capturing means for capturing a stroke of said movable input means relative to said character input region by sensing a sequence of coordinates of a sequence of points along the stroke and for identifying the direction of movement of said movable input means as a function of differences between coordinates of points in said sequence of points.

20. A data input apparatus as recited in claim 18, wherein said direction means comprises means for identifying a stroke of said movable input means relative to said character input region and said third means comprises means responsive to a fixed predetermined number of operator inputs to tile areas and strokes for recognizing the character being inputted by the operator.

21. A data input apparatus as recited in claim 1, wherein said third means is responsive only to said first and second tile identification signals for recognizing said character being inputted by the operator.

22. A data input apparatus as recited in claim 1, wherein said third means is responsive to sensor signals from less than all of said plurality of tile areas for recognizing said character being inputted by the operator.

23. A data input apparatus for recognizing any of a plurality of characters inputted by an operator, comprising:

a character input region for inputting a character;

said character input region including a plurality of sensors for sensing operator inputs and generating sensor signals indicative thereof and a plurality of predefined tile areas each including at least one of said plurality of sensors;

movable input means for providing operator inputs to any of said plurality of sensors by inputting data relevant to said tile areas;

analyzing means receiving said sensor signals for recognizing a character being inputted by the operator;

said analyzing means comprising:

first means responsive to said sensor signals for detecting an operator input to a first tile area where said movable input means is first sensed by a sensor and generating a first tile identification signal indicative thereof;

second means responsive to said sensor signals for detecting an operator input to a second tile area where said movable input means is secondly sensed by a sensor and generating a second tile identification signal indicative thereof; and third means responsive to said first tile identification signal and said second tile identification signal for recognizing a character being inputted by the operator and generating a character signal indicative thereof, wherein said tile areas are configured in accordance with a generic character configuration generic to a plurality of individual characters, each tile area corresponding to and representing one of a plurality of segments of the generic character configuration.

24. A data input apparatus as recited in claim 23, further comprising display means responding to said character signal for displaying the character recognized in response to operator inputs to first and second tile areas.

25. A data input apparatus as recited in claim 23, wherein said sensors are each within said predefined tile areas, further comprising additional sensors adjacent said predefined tile areas, and wherein said third means is responsive to signals outputted from said additional sensors for deducing intended operator inputs when said movable input means fails to provide an operator input to a tile area and for recognizing a character intended to be inputted by the operator and generating a character signal indicative thereof.

26. Data input apparatus for recognizing any of a plurality of characters inputted by an operator, comprising:

a character input region for inputting a single character;

said character input region including a plurality of sensors for sensing operator inputs and generating sensor signals indicative thereof and a plurality of predefined tile areas for sensing operator input of respective portions of the single character, each tile area including at least one of said plurality of sensors;

movable input means for providing operator inputs to any of said plurality of sensors by inputting data relevant to said tile areas;

analyzing means receiving said sensor signals for recognizing a character being inputted by the operator;

said analyzing means comprising:

first means responsive to said sensor signals for detecting an operator input to an initial tile area representing an initial portion of the character where said movable input means is initially sensed by a sensor and generating an initial tile identification signal indicative thereof;

second means for identifying a direction of movement of said movable input means and for generating a direction identifying signal indicative thereof, and third means responsive to said initial tile identification signal and said direction identifying signal for recognizing a character being inputted by the operator and generating a character signal indicative thereof.

27. A data input apparatus as recited in claim 26, wherein said third means comprises limiting means responding to said initial tile identification signal by identifying a limited number of possible input characters being inputted by the operator in correspondence to an initial tile area represented by said initial tile identification signal, each of said possible input characters starting with said initial tile area and having a unique subsequent tile area associated therewith, said limiting means generating a limiting signal indicative of said possible input characters, the data input apparatus further comprising fourth means responsive to said sensor signals for detecting an operator input to a second tile area where said movable input means is secondly sensed by a sensor and generating a second tile identification signal indicative thereof;

said third means responding to said limiting signal by determining whether said second tile identification signal identifies a tile area corresponding to one of said unique subsequent tile areas and, upon detecting that said second tile area is one of said unique subsequent tile areas, recognizing the inputted character as the character associated with the detected second tile area.

28. A data input apparatus as recited in claim 27, wherein said second means comprises capturing means for capturing a stroke of said movable input means relative to said character input region by sensing a sequence of coordinates of a sequence of points along the stroke and wherein, upon detecting failure of said second tile identification signal to identify any of the unique subsequent tile areas, said third means determines a slope of said stroke from said sequence of coordinates and recognizes said inputted character by comparing said slope with predetermined slope ranges and by identifying specific characters in correspondence with results of the comparison.

29. A data input apparatus as recited in claim 28, wherein said third means determines a particular slope range for comparison with said slope to recognize a particular character by identifying a boundary point on one of said unique subsequent tile areas corresponding to said particular character, identifying an initial point in said initial tile area wherein said movable input means first provided an input to said initial tile area, determining a nominal slope of a line connecting said initial point and said boundary point, and establishing the particular slope range in accordance with said nominal slope, said third means comparing the slope of said stroke from said sequence of coordinates with said particular slope range and recognizing said particular character upon determining that said slope of said stroke is within said particular slope range.

30. A data input apparatus as recited in claim 26, wherein said third means is responsive only to said initial tile identification signals and said direction identifying signal for recognizing said character being inputted by the operator.

31. A data input apparatus as recited in claim 26, wherein said third means is responsive to sensor signals from less than all of said plurality of tile areas for recognizing said character being inputted by the operator.

* * * * *